(12) United States Patent
Tamrakar et al.

(10) Patent No.: US 11,316,634 B2
(45) Date of Patent: Apr. 26, 2022

(54) SIGNAL PROCESSING METHOD AND DEVICE

(71) Applicant: CHINA ACADEMY OF TELECOMMUNICATIONS TECHNOLOGY, Beijing (CN)

(72) Inventors: Rakesh Tamrakar, Beijing (CN); Qiubin Gao, Beijing (CN); Hui Li, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 150 days.

(21) Appl. No.: 16/607,433

(22) PCT Filed: Mar. 28, 2018

(86) PCT No.: PCT/CN2018/080900
§ 371 (c)(1),
(2) Date: Oct. 23, 2019

(87) PCT Pub. No.: WO2018/196540
PCT Pub. Date: Nov. 1, 2018

(65) Prior Publication Data
US 2021/0143952 A1   May 13, 2021

(30) Foreign Application Priority Data
Apr. 26, 2017   (CN) .......................... 201710283017.6

(51) Int. Cl.
*H04L 5/00* (2006.01)
*H04B 7/06* (2006.01)
*H04L 1/00* (2006.01)

(52) U.S. Cl.
CPC ......... *H04L 5/0048* (2013.01); *H04B 7/0645* (2013.01); *H04B 7/0695* (2013.01); *H04L 1/0026* (2013.01); *H04L 5/0057* (2013.01)

(58) Field of Classification Search
CPC ... H04L 5/0048; H04L 1/0026; H04L 5/0057; H04L 1/00; H04L 5/00; H04L 1/0027;
(Continued)

(56) References Cited

U.S. PATENT DOCUMENTS

2011/0069629 A1   3/2011 Breit et al.
2013/0142134 A1   6/2013 Zhu et al.
(Continued)

FOREIGN PATENT DOCUMENTS

CN   101729114 A   6/2010
CN   101908951 A   12/2010
(Continued)

OTHER PUBLICATIONS

Japan Patent Office, First Office Action, JP App. No. 2019-557598, Applicant: China Academy of Telecommunications Technology, Date of Drafting: Dec. 21, 2020.
(Continued)

*Primary Examiner* — Kiet Tang
(74) *Attorney, Agent, or Firm* — Harness, Dickey & Pierce, P.L.C.

(57) ABSTRACT

Embodiments of the present disclosure provide a signal processing method and a signal processing device, which relate to the field of communication technology and used for the purpose of saving signaling resources. The signal processing method provided by embodiments of the present disclosure includes: transmitting a first indication message to a terminal device, wherein the first indication message is to trigger the terminal device to transmit feedback information on pilot signals; transmitting N downlink pilot signals to the terminal device, where N is an integer greater than or equal to 2, and the transmission manner of the N downlink pilot signals is semi-persistent transmission or aperiodic transmission, so that the terminal device, according to an
(Continued)

---

101 — transmitting a first indication message to a terminal, wherein the first indication message is to trigger the terminal to transmit feedback information on pilot signals 102 — transmitting N downlink pilot signals to the terminal, N is an integer greater than or equal to 2, and the transmission manner of the N downlink pilot signals is semi-persistent transmission or aperiodic transmission acquired precoding manner of the downlink pilot signals and the first indication message, determines a feedback manner of the feedback information on the N downlink pilot signals and performs feedback, and wherein the feedback manner includes not feeding back or one-time feeding back of the feedback information on the N downlink pilot signals. In the embodiments of the present disclosure, the base station or the terminal device may not transmit feedback information on a plurality of pilot signals, or may one-time transmit feedback information on a plurality of pilot signals, thereby effectively saving signaling resources.

19 Claims, 8 Drawing Sheets

(58) Field of Classification Search
CPC ... H04L 1/0029; H04L 5/0001; H04L 1/0023; H04B 7/0645; H04B 7/0695; H04B 7/0636; H04B 7/0686; H04W 16/28
See application file for complete search history.

(56) References Cited

U.S. PATENT DOCUMENTS

| | | | |
|---|---|---|---|
| 2013/0315337 | A1 | 11/2013 | Dai et al. |
| 2016/0212643 | A1* | 7/2016 | Park ..................... H04L 5/0048 |
| 2017/0207843 | A1* | 7/2017 | Jung ..................... H04B 7/0695 |
| 2018/0076940 | A1* | 3/2018 | Zhou ..................... H04L 5/0048 |
| 2018/0145807 | A1 | 5/2018 | Nagata et al. |
| 2018/0167124 | A1 | 6/2018 | Chen et al. |
| 2018/0175983 | A1* | 6/2018 | Yum ..................... H04L 5/0053 |
| 2019/0207731 | A1* | 7/2019 | Park ..................... H04B 7/0628 |

FOREIGN PATENT DOCUMENTS

| | | |
|---|---|---|
| CN | 102104961 A | 6/2011 |
| CN | 102111246 A | 6/2011 |
| CN | 102170330 A | 8/2011 |
| CN | 102857458 A | 1/2013 |
| CN | 105577328 A | 5/2016 |
| JP | 2017038394 A | 2/2017 |
| JP | 2018518102 A | 7/2018 |
| JP | 2018524868 A | 8/2018 |
| WO | 2014005624 A1 | 1/2014 |
| WO | 2016204546 A1 | 12/2016 |
| WO | 2017026455 A1 | 2/2017 |

OTHER PUBLICATIONS

Korean Intellectual Property Office, Notification of Reason for Refusal, KR App. No. 10-2019-7034726, Applicant: China Academy of Telecommunications Technology, Date of Dispatch: Mar. 17, 2021.
3GPP TSG RAN WG1 Meeting #88b, R1-1704229, Spokane, Washington, USA, Apr. 3-7, 2017, Agenda Item: 8.1.2.2.1, Source: Huawei, HiSilicon, Title: DL Beam Management, Document for: Discussion and Decision.
3GPP TSG RAN WG1 Meeting #88bis, R1-1704488, Spokane, WA, USA, Apr. 3-7, 2017, Agenda Item: 8.1.2.2.1, Source: Vivo, Title: Beam Management and Beam Reporting, Document for: Discussion and Decision.
3GPP TSG RAN WG1 Meeting #79, R1-144813, San Francisco, CA, USA, Nov. 17-21, 2014, Agenda Item: 6.3.3.3, Source: ZTE, Title: Initial Consideration on Enhancements Targeting 2D Antenna Array for EB/FD-MIMO, Document for: Discussion and Decision.
3GPP TSG RAN WG1 Meeting #88bis, R1-1704664, Spokane, Washington, USA, Apr. 3-7, 2017, Agenda Item: 8.1.2.3.1, Source: Xinwei, Title: Further Discussion on Aperiodic CSI-RS Resource Activation, Document for: Discussion and Decision.
The State Intellectual Property Office of People's Republic of China, Second Office Action, Application or Publication No. 201710283017.6, Applicant: China Academy of Telecommunications Technology, Title of Invention: Signal Processing Method and Device, Issue Date: Apr. 23, 2020.
3GPP TSG RAN WG1#88 Bis, R1-1705962, Agenda Item: 8.1.2.2.3, Source: Nokia, Alcatel-Lucent Shanghai Bell, Title: SRS Transmission for Beam Management, Document For: Discussion and Decision.
Patent Cooperation Treaty, Advance E-Mail, PCT, Notification of Transmittal of Translation of the International Preliminary Report on Patentability, dated Nov. 7, 2019, PCT/CN2018/080900, Applicant: China Academy of Telecommunications Technology, Authorized Officer: Xiaofan Tang.
The State Intellectual Property Office of People's Republic of China, Applicant: China Academy of Telecommunications Technology, Title of Invention: Signal Processing Method and Device, Document Number or Title: WO 2017026455A1, Publication Date: Feb. 16, 2017.

* cited by examiner

SIGNAL PROCESSING METHOD AND DEVICE

CROSS-REFERENCE TO RELATED APPLICATION

The present application is the U.S. national phase of PCT Application No. PCT/CN2018/080900 filed on Mar. 28, 2018, which claims a priority of the Chinese patent application 201710283017.6 filed on Apr. 26, 2017, which are incorporated herein by reference in their entirety.

TECHNICAL FIELD

Embodiments of the present disclosure relate to the field of communication technology, and in particular, to a signal processing method and a signal processing device.

BACKGROUND

In the New Radio (NR) system, semi-persistent channel state information reference signal (CSI-RS) transmission and aperiodic CSI-RS transmission are supported.

Taking a semi-persistent CSI-RS triggering as an example, the transmitting of a semi-persistent CSI-RS by a base station may be triggered by Media Access Control (MAC) signaling or physical layer signaling. After receiving a trigger signaling, a terminal device may measure the semi-persistent CSI-RS and feedback Channel State Information (CSI). The base station may use the signaling for triggering transmitting of the semi-persistent CSI-RS to trigger the terminal device to feedback the semi-persistent CSI or use another trigger signaling to trigger the terminal device to feedback the semi-persistent CSI.

In the NR system, semi-persistent CSI-RS triggering and aperiodic CSI-RS triggering are mainly used to trigger the terminal device to perform semi-persistent CSI feedback and aperiodic CSI feedback. In the process of semi-persistent CSI-RS triggering and aperiodic transmission, the terminal device feeds back the CSI-RS of each base station according to the indication of a base station, thereby causing waste of resources.

SUMMARY

In view of the above, embodiments of the present disclosure provide a signal processing method and a signal processing device in order to effectively save signaling resources.

In order to solve the above technical problem, in a first aspect, an embodiment of the present disclosure provides a signal processing method, which is applied to a base station and includes:

transmitting a first indication message to a terminal device, wherein the first indication message is to trigger the terminal device to transmit feedback information on pilot signals; and transmitting N downlink pilot signals to the terminal device, where N is an integer greater than or equal to 2, and the transmission manner of the N downlink pilot signals is semi-persistent transmission or aperiodic transmission, so that the terminal device, according to an acquired precoding manner of the downlink pilot signals and the first indication message, determines a feedback manner of the feedback information on the N downlink pilot signals and performs feedback, and wherein the feedback manner includes not feeding back or one-time feeding back of the feedback information on the N downlink pilot signals.

In some possible embodiments of the present disclosure, the precoding manner of the downlink pilot signals includes: using the same precoding manner for the N downlink pilot signals and using different precoding manners for the N downlink pilot signals.

In some possible embodiments of the present disclosure, a manner of notifying the precoding manner of the downlink pilot signals includes:

including the precoding manner of the downlink pilot signals in the first indication message, and notifying the precoding manner of the downlink pilot signals by the first indication message; or configuring the precoding manner of the downlink pilot signals to the terminal device by using a high-layer signaling; or transmitting the precoding manner of the downlink pilot signals to the terminal device; or transmitting a notification signaling to the terminal device, wherein the notification signaling includes the precoding manner of the downlink pilot signals; or pre-agreeing the precoding manner of the downlink pilot signals with the terminal device.

In some possible embodiments of the present disclosure, in a case that the terminal device determines that the feedback manner of the feedback information on the N downlink pilot signals is one-time feeding back of the feedback information on the N downlink pilot signals, the method further includes:

receiving the feedback information on the N downlink pilot signals from the terminal device; and determining a downlink transmission beam according to the feedback information on the N downlink pilot signals.

In a case that the transmission manner of the N downlink pilot signals is semi-persistent transmission and the feedback manner is one-time feeding back of the feedback information on the N downlink pilot signals, the method further includes:

transmitting a second indication message to the terminal device, wherein the second indication message is to indicate the terminal device to stopping transmitting the feedback information on the pilot signals.

In a second aspect, an embodiment of the present disclosure provides a signal processing method, which is applied to a terminal device and includes:

receiving a first indication message from a base station, wherein the first indication message is to trigger transmission of feedback information on pilot signals;

receiving N downlink pilot signals transmitted by the base station, and measuring the N downlink pilot signals respectively, where N is an integer greater than or equal to 2, and the transmission manner of the N downlink pilot signals is semi-persistent transmission or aperiodic transmission;

acquiring a precoding manner of the downlink pilot signals; and determining a feedback manner of the feedback information on the N downlink pilot signals and performing feedback, according to the precoding manner of the downlink pilot signals, wherein the feedback manner includes not feeding back or one-time feeding back of the feedback information on the N downlink pilot signals.

In some possible embodiments of the present disclosure, the precoding manner of the downlink pilot signals includes: using the same precoding manner for the N downlink pilot signals and using different precoding manners for the N downlink pilot signals, and the acquiring the precoding manner of the downlink pilot signals includes:

acquiring the precoding manner of the downlink pilot signals according to the first indication message, wherein the precoding manner of the downlink pilot signals is included in the first indication message; or acquiring the precoding manner of the downlink pilot signals by using a high-layer signaling; or acquiring the precoding manner of the downlink pilot signals according to a pre-agreement with the base station; or receiving the precoding manner of the downlink pilot signals transmitted by the base station; or receiving a notification signaling transmitted by the base station, and acquiring the precoding manner of the downlink pilot signals according to the notification signaling, wherein the precoding manner of the downlink pilot signals is included in the notification signaling.

In some possible embodiments of the present disclosure, the precoding manner of the downlink pilot signals includes: using the same precoding manner for the N downlink pilot signals and using different precoding manners for the N downlink pilot signals, and the determining the feedback manner of the feedback information on the N downlink pilot signals and performing feedback according to the precoding manner of the downlink pilot signals includes:

in a case that the same precoding manner is used for the N downlink pilot signals, if the one-time feeding back is determined to be required according to the notification of the base station or a pre-agreement with the base station, determining that the feedback manner of the feedback information on the N downlink pilot signals is not feeding back; or in a case that the same precoding manner is used for the N downlink pilot signals, determining one or more target receiving beams with the best signal receiving quality from receiving beams which receive the N downlink pilot signals, according to a measurement result of the N downlink pilot signals, and one-time feeding back information on the target receiving beams to the base station; or in a case that different precoding manners are used for the N downlink pilot signals, determining one or more target receiving beams with the best signal receiving quality from receiving beams which receive the N downlink pilot signals, according to a measurement result of the N downlink pilot signals, determining target transmitting beams corresponding to the target receiving beams, and one-time feeding back information on the target transmitting beams or information on the downlink pilot signals received by the target receiving beams to the base station.

In some possible embodiments of the present disclosure, in a case that the transmission manner of the N downlink pilot signals is semi-persistent transmission and the feedback manner is one-time feeding back of the feedback information on the N downlink pilot signals, the method further includes:

receiving a second indication message from the base station, wherein the second indication message is to indicate stopping transmitting the feedback information on the pilot signals; and stopping transmitting the feedback information on the pilot signals to the base station according to the second indication message.

In a third aspect, an embodiment of the present disclosure provides a signal processing method, which is applied to a base station and includes:

transmitting a third indication message to a terminal device, wherein the third indication message is to trigger the terminal device to transmit uplink pilot signals;

receiving M uplink pilot signals transmitted by the terminal device according to an acquired precoding manner of the uplink pilot signals, and measuring the M uplink pilot signals respectively, where M is an integer greater than or equal to 2, and the transmission manner of the M uplink pilot signals is semi-persistent transmission or aperiodic transmission;

acquiring a precoding manner of the M uplink pilot signals; and determining a feedback manner of the feedback information on the M uplink pilot signals and performing feedback, according to the precoding manner of the uplink pilot signals, wherein the feedback manner includes not feeding back or one-time feeding back of the feedback information on the M uplink pilot signals.

In some possible embodiments of the present disclosure, the precoding manner of the uplink pilot signals includes: using the same precoding manner for the M uplink pilot signals and using different precoding manners for the M uplink pilot signals, and a manner of notifying the precoding manner of the uplink pilot signals includes:

including the precoding manner of the uplink pilot signals in the third indication message, and notifying the precoding manner of the uplink pilot signals by the third indication message; or configuring the precoding manner of the uplink pilot signals to the terminal device by using a high-layer signaling; or transmitting the precoding manner of the uplink pilot signals to the terminal device; or transmitting a notification signaling to the terminal device, wherein the notification signaling includes the precoding manner of the uplink pilot signals; or pre-agreeing the precoding manner of the uplink pilot signals with the terminal device.

In some possible embodiments of the present disclosure, the precoding manner of the uplink pilot signals includes: using the same precoding manner for the M uplink pilot signals and using different precoding manners for the M uplink pilot signals;

the determining the feedback manner of the feedback information on the M uplink pilot signals and performing feedback according to the precoding manner of the uplink pilot signals includes:

in a case that the same precoding manner is used for the M uplink pilot signals, determining that the feedback manner of the feedback information on the M uplink pilot signals is not feeding back; or in a case that different precoding manners are used for the M uplink pilot signals, determining one or more target uplink pilot signals with the best signal quality according to a measurement result of the M uplink pilot signals, and one-time feeding back information on the target uplink pilot signals to the terminal device.

In some possible embodiments of the present disclosure, in a case that the transmission manner of the M downlink pilot signals is semi-persistent transmission, the method further includes:

transmitting a fourth indication message to the terminal device, wherein the fourth indication message is to indicate the terminal device to stop transmitting the uplink pilot signals.

In some possible embodiments of the present disclosure, the method further includes:

transmitting a fifth indication message to the terminal device, wherein the fifth indication message is to notify the terminal device whether a transmitting beam needs to be changed when the uplink pilot signals are subsequently transmitted.

In a fourth aspect, an embodiment of the present disclosure provides a signal processing method, which is applied to a terminal device and includes:

receiving a third indication message from a base station, wherein the third indication message is to trigger transmission of uplink pilot signals;

acquiring a precoding manner of the uplink pilot signals; and transmitting M uplink pilot signals according to the precoding manner of the uplink pilot signals and the third indication message, where M is an integer greater than or equal to 2, and the transmission manner of the M uplink pilot signals is semi-persistent transmission or aperiodic transmission, so that the base station, according to the acquired precoding manner of the uplink pilot signals, determines a feedback manner of the feedback information on the M uplink pilot signals and performs feedback, and wherein the feedback manner includes not feeding back or one-time feeding back of the feedback information on the M uplink pilot signals.

In some possible embodiments of the present disclosure, the acquiring the precoding manner of the uplink pilot signals includes:

including the precoding manner of the uplink pilot signals in the third indication message, and the acquiring the precoding manner of the uplink pilot signals includes: acquiring the precoding manner of the uplink pilot signals according to the third indication message; or acquiring the precoding manner of the uplink pilot signals according to a high-layer signaling; or acquiring the precoding manner of the uplink pilot signals according to a pre-agreement with the base station; or receiving the precoding manner of the uplink pilot signals transmitted by the base station; or receiving a notification signaling transmitted by the base station, and acquiring the precoding manner of the uplink pilot signals according to the notification signaling, wherein the precoding manner of the uplink pilot signals is included in the notification signaling.

In some possible embodiments of the present disclosure, in a case that the transmission manner of the M uplink pilot signals is semi-persistent transmission, the method further includes:

receiving a fourth indication message transmitted by the base station, wherein the fourth indication message is to indicate the terminal device to stop transmitting the uplink pilot signals; and stopping transmitting the uplink pilot signals to the base station according to the fourth indication message.

In some possible embodiments of the present disclosure, the method further includes:

receiving a fifth indication message transmitted by the base station, wherein the fifth indication message is to notify whether a transmitting beam needs to be changed when the uplink pilot signals are subsequently transmitted.

In some possible embodiments of the present disclosure, in a case that the base station determines that the feedback manner of the feedback information on the M uplink pilot signals is one-time feeding back of the feedback information on the M uplink pilot signals, the method further includes:

receiving the feedback information on the M uplink pilot signals transmitted by the base station; and determining an uplink transmission beam according to the feedback information on the M uplink pilot signals.

In a fifth aspect, an embodiment of the present disclosure provides a signal processing device, which includes:

a first transmitting module, configured to transmit a first indication message to a terminal device, wherein the first indication message is to trigger the terminal device to transmit feedback information on pilot signals; and a second transmitting module, configured to transmit N downlink pilot signals to the terminal device, where N is an integer greater than or equal to 2, and the transmission manner of the N downlink pilot signals is semi-persistent transmission or aperiodic transmission, so that the terminal device, according to an acquired precoding manner of the downlink pilot signals and the first indication message, determines a feedback manner of the feedback information on the N downlink pilot signals and performs feedback, and wherein the feedback manner includes not feeding back or one-time feeding back of the feedback information on the N downlink pilot signals.

In some possible embodiments of the present disclosure, the precoding manner of the downlink pilot signals includes: using the same precoding manner for the N downlink pilot signals and using different precoding manners for the N downlink pilot signals; wherein the precoding manner of the downlink pilot signals is included in the first indication message.

In some possible embodiments of the present disclosure, the device further includes:

a configuring module, configured to include the precoding manner of the downlink pilot signals in the first indication message; or configure the precoding manner of the downlink pilot signals to the terminal device by using a high-layer signaling; or transmit the precoding manner of the downlink pilot signals to the terminal device; or transmit a notification signaling to the terminal device, wherein the notification signaling includes the precoding manner of the downlink pilot signals; or pre-agree the precoding manner of the downlink pilot signals with the terminal device.

In a sixth aspect, an embodiment of the present disclosure provides a signal processing device, which includes:

a first transmitting module, configured to receive a first indication message from a base station, wherein the first indication message is to trigger transmission of feedback information on pilot signals;

a second transmitting module, configured to receive N downlink pilot signals transmitted by the base station, and measure the N downlink pilot signals respectively, where N is an integer greater than or equal to 2, and the transmission manner of the N downlink pilot signals is semi-persistent transmission or aperiodic transmission;

an acquiring module, configured to acquire a precoding manner of the downlink pilot signals; and a determining module, configured to determine a feedback manner of the feedback information on the N downlink pilot signals and perform feedback, according to the precoding manner of the downlink pilot signals, wherein the feedback manner includes not feeding back or one-time feeding back of the feedback information on the N downlink pilot signals.

In some possible embodiments of the present disclosure, the precoding manner of the downlink pilot signals includes: using the same precoding manner for the N downlink pilot signals and using different precoding manners for the N downlink pilot signals, and the acquiring module is specifically configured to:

acquire the precoding manner of the downlink pilot signals according to the first indication message, wherein the precoding manner of the downlink pilot signals is included in the first indication message; or acquire the precoding manner of the downlink pilot signals by using a high-layer signaling; or acquire the precoding manner of the downlink pilot signals according to a pre-agreement with the base station; or receive the precoding manner of the downlink pilot signals transmitted by the base station; or receive a notification signaling transmitted by the base station, and acquire the precoding manner of the downlink pilot signals according to the notification signaling, wherein the precoding manner of the downlink pilot signals is included in the notification signaling.

In some possible embodiments of the present disclosure, the precoding manner of the downlink pilot signals includes: using the same precoding manner for the N downlink pilot signals and using different precoding manners for the N downlink pilot signals, and the determining module is specifically configured to:

in a case that the same precoding manner is used for the N downlink pilot signals, if not feeding back is determined according to the notification of the base station or a pre-agreement with the base station, determine that the feedback manner of the feedback information on the N downlink pilot signals is not feeding back; or in a case that the same precoding manner is used for the N downlink pilot signals, if one-time feeding back is determined to be required according to the notification of the base station or a pre-agreement with the base station, determine one or more target receiving beams with the best signal receiving quality from receiving beams which receive the N downlink pilot signals, according to a measurement result of the N downlink pilot signals, and one-time feed back information on the target receiving beams to the base station; or in a case that different precoding manners are used for the N downlink pilot signals, determine one or more target receiving beams with the best signal receiving quality from receiving beams which receive the N downlink pilot signals, according to a measurement result of the N downlink pilot signals, determine target transmitting beams corresponding to the target receiving beams, and one-time feed back information on the target transmitting beams or information on the downlink pilot signals received by the target receiving beams to the base station.

In a seventh aspect, an embodiment of the present disclosure provides a signal processing device, which includes:

a first transmitting module, configured to transmit a third indication message to a terminal device, wherein the third indication message is to trigger the terminal device to transmit uplink pilot signals;

a receiving module, configured to receive M uplink pilot signals transmitted by the terminal device according to an acquired precoding manner of the uplink pilot signals, and measure the M uplink pilot signals respectively, where M is an integer greater than or equal to 2, and the transmission manner of the M uplink pilot signals is semi-persistent transmission or aperiodic transmission;

an acquiring module, configured to acquire a precoding manner of the M uplink pilot signals; and a determining module, configured to determine a feedback manner of the feedback information on the M uplink pilot signals and perform feedback, according to the precoding manner of the uplink pilot signals, wherein the feedback manner includes not feeding back or one-time feeding back of the feedback information on the M uplink pilot signals.

In some possible embodiments of the present disclosure, the precoding manner of the uplink pilot signals includes: using the same precoding manner for the M uplink pilot signals and using different precoding manners for the M uplink pilot signals.

In some possible embodiments of the present disclosure, the device further includes:

a configuring module, configured to include the precoding manner of the uplink pilot signals in the third indication message, or configure the precoding manner of the uplink pilot signals to the terminal device by using a high-layer signaling, or transmit the precoding manner of the uplink pilot signals to the terminal device, or transmit a notification signaling to the terminal device, wherein the notification signaling includes the precoding manner of the uplink pilot signals, or pre-agree the precoding manner of the uplink pilot signals with the terminal device.

In some possible embodiments of the present disclosure, the precoding manner of the uplink pilot signals includes: using the same precoding manner for the M uplink pilot signals and using different precoding manners for the M uplink pilot signals; and the determining module is specifically configured to:

in a case that the same precoding manner is used for the M uplink pilot signals, determine that the feedback manner of the feedback information on the M uplink pilot signals is not feeding back; or in a case that different precoding manners are used for the M uplink pilot signals, determine one or more target uplink pilot signals with the best signal quality according to a measurement result of the M uplink pilot signals, and one-time feed back information on the target uplink pilot signals to the terminal device.

In an eighth aspect, an embodiment of the present disclosure provides a signal processing device, which includes:

a first receiving module, configured to receive a third indication message from a base station, wherein the third indication message is to trigger transmission of uplink pilot signals;

an acquiring module, configure to acquire a precoding manner of the uplink pilot signals; and a transmitting module, configured to transmit M uplink pilot signals according to the precoding manner of the uplink pilot signals and the third indication message, where M is an integer greater than or equal to 2, and the transmission manner of the M uplink pilot signals is semi-persistent transmission or aperiodic transmission, so that the base station, according to the acquired precoding manner of the uplink pilot signals, determines a feedback manner of the feedback information on the M uplink pilot signals and performs feedback, and wherein the feedback manner includes not feeding back or one-time feeding back of the feedback information on the M uplink pilot signals.

In some possible embodiments of the present disclosure, the precoding manner of the uplink pilot signals includes: using the same precoding manner for the M uplink pilot signals and using different precoding manners for the M uplink pilot signals; and the acquiring module is specifically configured to:

acquire the precoding manner of the uplink pilot signals according to the third indication message, wherein the precoding manner of the uplink pilot signals is included in the third indication message; or acquire the precoding manner of the uplink pilot signals according to a high-layer signaling; or acquire the precoding manner of the uplink pilot signals according to a pre-agreement with the base station; or receive the precoding manner of the uplink pilot signals transmitted by the base station; or receive a notification signaling transmitted by the base station, and acquire the precoding manner of the uplink pilot signals according to the notification signaling, wherein the precoding manner of the uplink pilot signals is included in the notification signaling.

In a ninth aspect, an embodiment of the present disclosure provides a network side device, which includes a processor, a storage, and a computer program which is stored in the storage and is capable of running on the processor, wherein when the computer program is executed by the processor, steps of the signal processing method according to the first aspect are implemented.

In a tenth aspect, an embodiment of the present disclosure provides a terminal device side device, which includes a processor, a storage, and a computer program which is stored in the storage and is capable of running on the processor, wherein when the computer program is executed by the processor, steps of the signal processing method according to the second aspect are implemented.

In an eleventh aspect, an embodiment of the present disclosure provides a network side device, which includes a processor, a storage, and a computer program which is stored in the storage and is capable of running on the processor, wherein when the computer program is executed by the processor, steps of the signal processing method according to the third aspect are implemented.

In a twelfth aspect, an embodiment of the present disclosure provides a terminal device side device, which includes a processor, a storage, and a computer program which is stored in the storage and is capable of running on the processor, wherein when the computer program is executed by the processor, steps of the signal processing method according to the fourth aspect are implemented.

In a thirteenth aspect, an embodiment of the present disclosure provides a computer readable storage medium on which a computer program is stored, wherein when the computer program is executed by a processor, steps of the signal processing method according to the first aspect are implemented.

In a fourteenth aspect, an embodiment of the present disclosure provides a computer readable storage medium on which a computer program is stored, wherein when the computer program is executed by a processor, steps of the signal processing method according to the second aspect are implemented.

In a fifteenth aspect, an embodiment of the present disclosure provides a computer readable storage medium on which a computer program is stored, wherein when the computer program is executed by a processor, steps of the signal processing method according to the third aspect are implemented.

In a sixteenth aspect, an embodiment of the present disclosure provides a computer readable storage medium on which a computer program is stored, wherein when the computer program is executed by a processor, steps of the signal processing method according to the fourth aspect are implemented.

The above technical solutions provided by the embodiments of the present disclosure can bring about the following advantageous effects.

In the embodiments of the present disclosure, the base station or the terminal device may not transmit feedback information on a plurality of pilot signals, or may one-time transmit feedback information on a plurality of pilot signals. Therefore, unlike the related art, with the solutions in the embodiments of the present disclosure, it is not required to transmit feedback information separately for each pilot signal, thereby effectively saving signaling resources.

BRIEF DESCRIPTION OF THE DRAWINGS

In order to illustrate the technical solutions of embodiments of the present disclosure or the related art in a clearer manner, the drawings desired for the embodiments of the present disclosure will be described hereinafter briefly. Obviously, the following drawings merely relate to some embodiments of the present disclosure, and based on these drawings, a person skilled in the art may obtain other drawings without any creative effort.

DETAILED DESCRIPTION

Specific embodiments of the present disclosure will be further described in detail below with reference to the drawings and embodiments. The following examples are intended to illustrate the present disclosure, but are not intended to limit the scope of the embodiments of the present disclosure.

Figure 1:
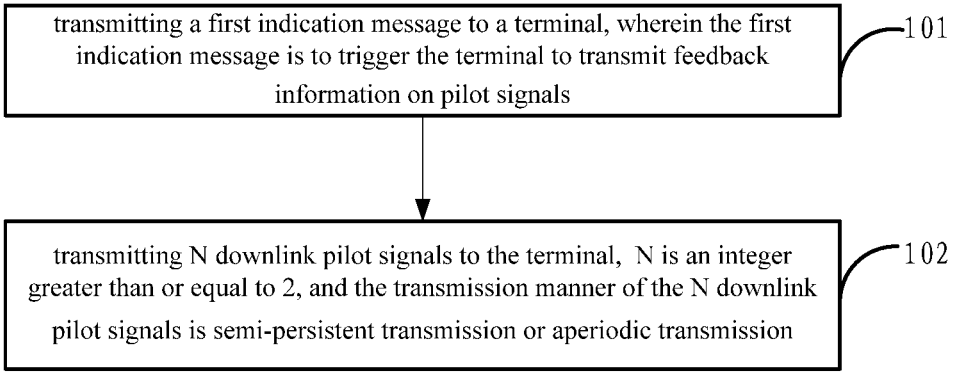
FIG. 1 is a flowchart showing a signal processing method according to some embodiments of the present disclosure.

As shown in FIG. 1, an embodiment of the present disclosure provides a signal processing method, which is applied to a base station and includes Step 101 to 102.

Step 101: transmitting a first indication message to a terminal device, wherein the first indication message is to trigger the terminal device to transmit feedback information on pilot signals.

Step 102: transmitting N downlink pilot signals to the terminal device, where N is an integer greater than or equal to 2, and the transmission manner of the N downlink pilot signals is semi-persistent transmission or aperiodic transmission.

Then, according to an acquired precoding manner of the downlink pilot signals and the first indication message, the terminal device determines a feedback manner of the feedback information on the N downlink pilot signals and performs feedback, wherein the feedback manner includes not feeding back or one-time feeding back of the feedback information on the N downlink pilot signals.

The downlink pilot signals include but are not limited to channel state information reference signal (CSI-RS).

In the above embodiment, the precoding manner of the downlink pilot signals includes: using the same precoding manner for the N downlink pilot signals and using different precoding manners for the N downlink pilot signals.

In some possible embodiments of the present disclosure, the precoding manner of the downlink pilot signals is included in the first indication message, and the precoding manner of the downlink pilot signals is notified by using the first indication message. Then, the terminal device acquires the precoding manner of the downlink pilot signals through the first indication message.

In some possible embodiments of the present disclosure, the precoding manner of the downlink pilot signals may also be configured thorough any of the following ways:

configuring the precoding manner of the downlink pilot signals to the terminal device by using a high-layer signaling; or transmitting the precoding manner of the downlink pilot signals to the terminal device; or transmitting a notification signaling to the terminal device, wherein the notification signaling includes the precoding manner of the downlink pilot signals; or pre-agreeing the precoding manner of the downlink pilot signals with the terminal device.

In some possible embodiments of the present disclosure, in a case that the terminal device determines that the feedback manner of the feedback information on the N downlink pilot signals is one-time feeding back of the feedback information on the N downlink pilot signals, the method further includes:

receiving the feedback information on the N downlink pilot signals from the terminal device, and determining a downlink transmission beam according to the feedback information on the N downlink pilot signals, so as to improve transmission performance.

In the above embodiment, in a case that the transmission manner of the N downlink pilot signals is semi-persistent transmission and the feedback manner is one-time feeding back of the feedback information on the N downlink pilot signals, the method further includes: transmitting a second indication message to the terminal device, wherein the second indication message is to indicate the terminal device to stop transmitting the feedback information on the pilot signals.

In the embodiments of the present disclosure, the terminal device may not transmit feedback information on a plurality of pilot signals, or may one-time transmit feedback information on a plurality of pilot signals. Therefore, unlike the related art, with the solutions in the embodiments of the present disclosure, it is not required to transmit feedback information separately for each pilot signal, thereby effectively saving signaling resources.

Figure 2:
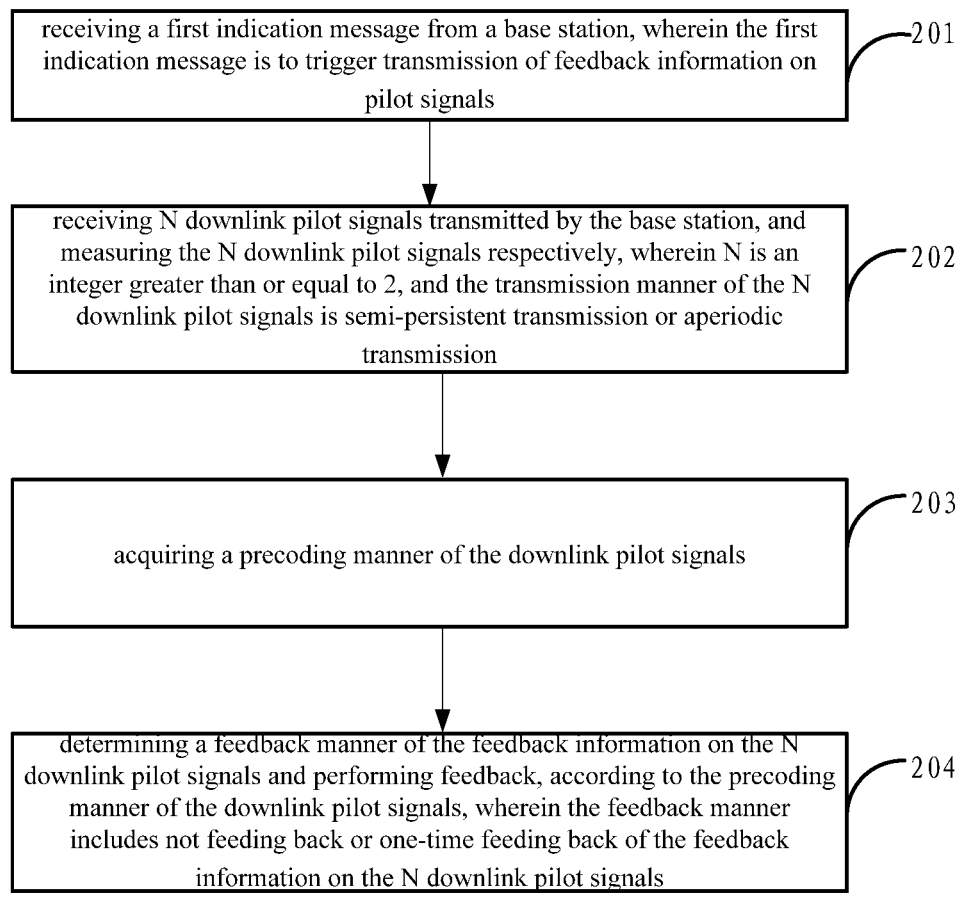
FIG. 2 is another flowchart showing a signal processing method according to some embodiments of the present disclosure.

As shown in FIG. 2, an embodiment of the present disclosure provides a signal processing method, which is applied to a base station and includes Steps 201 to 204:

Step 201: receiving a first indication message from a base station, wherein the first indication message is to trigger transmission of feedback information on pilot signals.

Step 202: receiving N downlink pilot signals transmitted by the base station, and measuring the N downlink pilot signals respectively, where N is an integer greater than or equal to 2, and the transmission manner of the N downlink pilot signals is semi-persistent transmission or aperiodic transmission.

The downlink pilot signals include but are not limited to CSI-RS.

Step 203: acquiring a precoding manner of the downlink pilot signals.

In some possible embodiments of the present disclosure, the precoding manner of the downlink pilot signals includes: using the same precoding manner for the N downlink pilot signals and using different precoding manners for the N downlink pilot signals.

Herein, the terminal device may acquire the precoding manner of the downlink pilot signals in any of the following ways.

The terminal device may acquire the precoding manner of the downlink pilot signals through the first indication message, wherein the precoding manner of the downlink pilot signals is included in the first indication message; or the terminal device may acquire the precoding manner of the downlink pilot signals by using a high-layer signaling; or the terminal device may acquire the precoding manner of the downlink pilot signals according to a pre-agreement with the base station; or the terminal device may receive the precoding manner of the downlink pilot signals transmitted by the base station; or the terminal device may receive a notification signaling transmitted by the base station, and acquire the precoding manner of the downlink pilot signals according to the notification signaling, wherein the precoding manner of the downlink pilot signals is included in the notification signaling.

Step 204: determining a feedback manner of the feedback information on the N downlink pilot signals and performing feedback, according to the precoding manner of the downlink pilot signals, wherein the feedback manner includes not feeding back or one-time feeding back of the feedback information on the N downlink pilot signals.

In this step, in a case that the same precoding manner is used for the N downlink pilot signals, if not feeding back is determined according to the notification of the base station or a pre-agreement with the base station, the terminal device determines that the feedback manner of the feedback information on the N downlink pilot signals is not feeding back; or in a case that the same precoding manner is used for the N downlink pilot signals, if one-time feeding back is determined to be required according to the notification of the base station or a pre-agreement with the base station, the terminal device determines one or more target receiving beams with the best signal receiving quality from receiving beams which receive the N downlink pilot signals, according to a measurement result of the N downlink pilot signals, and one-time feeds back information on the target receiving beams to the base station; or in a case that different precoding manners are used for the N downlink pilot signals, the terminal device determines one or more target receiving beams with the best signal receiving quality from receiving beams which receive the N downlink pilot signals, according to a measurement result of the N downlink pilot signals, determines target transmitting beams corresponding to the target receiving beams, and one-time feeds back information on the target transmitting beams or information on the downlink pilot signals received by the target receiving beams to the base station.

That is, in a case that it is determined that the same precoding manner is used for the N downlink pilot signals, it is necessary to further determine the feedback manner in combination with the notification of the base station or the pre-arrangement with the base station. How the base station informs the terminal device is not limited herein, for example, the base station may notify the terminal device by a separate signaling, or notify the terminal device together with other signaling, and the like.

In this embodiment, in a case that the transmission manner of the N downlink pilot signals is semi-persistent transmission and the feedback manner is one-time feeding back of the feedback information on the N downlink pilot signals, the method may further include:

receiving a second indication message from the base station, wherein the second indication message is to indicate stopping transmitting the feedback information on the pilot signals; and stopping transmitting the feedback information on the pilot signals to the base station according to the second indication message.

In the embodiments of the present disclosure, the terminal device may not transmit feedback information on a plurality of pilot signals, or may one-time transmit feedback information on a plurality of pilot signals. Therefore, unlike the related art, with the solutions in the embodiments of the present disclosure, it is not required to transmit feedback information separately for each pilot signal, thereby effectively saving signaling resources.

Figure 3:
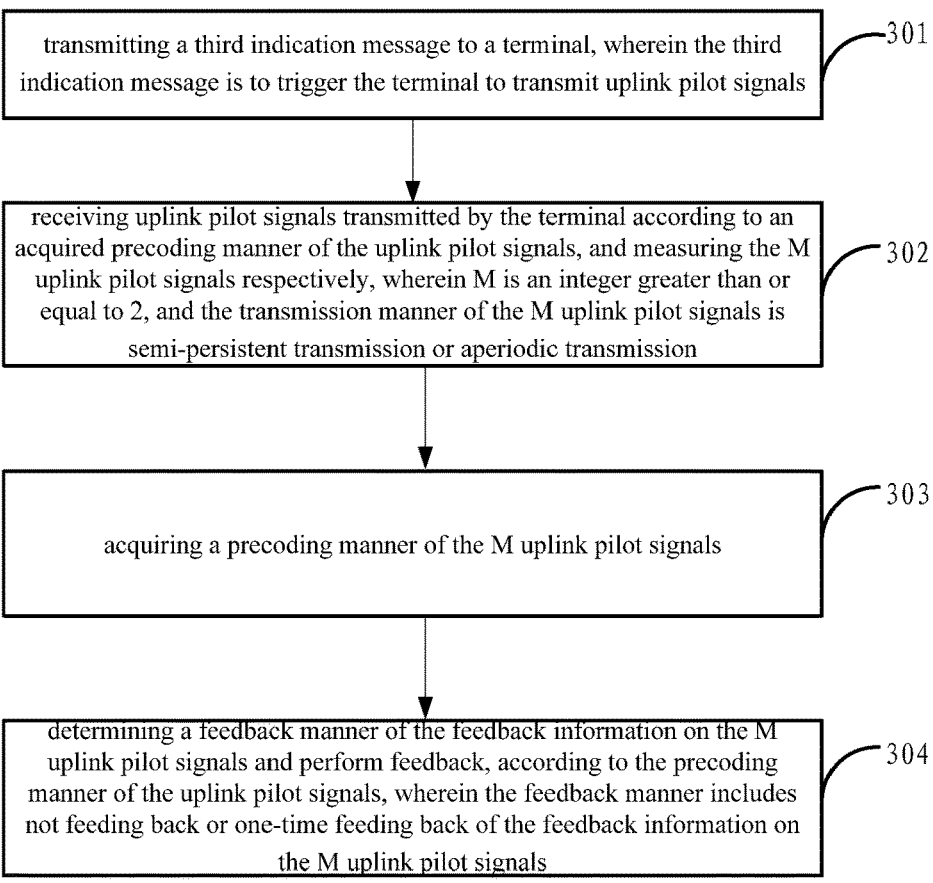
FIG. 3 is yet another flowchart showing a signal processing method according to some embodiments of the present disclosure.

As shown in FIG. 3, an embodiment of the present disclosure provides a signal processing method, which is applied to a base station and includes Steps 301 to 304:

Step 301: transmitting a third indication message to a terminal device, wherein the third indication message is to trigger the terminal device to transmit uplink pilot signals. The uplink pilot signals are not limited to Sounding Reference Signals (SRS).

Step 302: receiving M uplink pilot signals transmitted by the terminal device according to an acquired precoding manner of the uplink pilot signals, and measuring the M uplink pilot signals respectively, where M is an integer greater than or equal to 2, and the transmission manner of the M uplink pilot signals is semi-persistent transmission or aperiodic transmission.

Step 303: acquiring a precoding manner of the M uplink pilot signals.

In some possible embodiments of the present disclosure, the precoding manner of the downlink pilot signals includes: using the same precoding manner for the M uplink pilot signals and using different precoding manners for the M uplink pilot signals. The base station may indicate the precoding manner of the M uplink pilot signals to the terminal device in the following ways:

including the precoding manner of the uplink pilot signals in the third indication message, and notifying the precoding manner of the uplink pilot signals by the third indication message; or configuring the precoding manner of the uplink pilot signals to the terminal device by using a high-layer signaling; or transmitting the precoding manner of the uplink pilot signals to the terminal device; or transmitting a notification signaling to the terminal device, wherein the notification signaling includes the precoding manner of the uplink pilot signals; or pre-agreeing the precoding manner of the uplink pilot signals with the terminal device.

After the base station indicates the precoding mode to the terminal device, the base station may store the information by itself. Therefore, in this step, the precoding manner of the uplink pilot signals may be acquired by using the information stored by the base station itself.

S304: determining a feedback manner of the feedback information on the M uplink pilot signals and performing feedback, according to the precoding manner of the uplink pilot signals, wherein the feedback manner includes not feeding back or one-time feeding back of the feedback information on the M uplink pilot signals.

In this step, the base station may determine the feedback manner in the following ways:

the determining the feedback manner of the feedback information on the M uplink pilot signals and performing feedback according to the precoding manner of the uplink pilot signals includes:

in a case that the same precoding manner is used for the M uplink pilot signals, determining that the feedback manner of the feedback information on the M uplink pilot signals is not feeding back; or in a case that different precoding manners are used for the M uplink pilot signals, determining one or more target uplink pilot signals with the best signal quality according to a measurement result of the M uplink pilot signals, and one-time feeding back information on the target uplink pilot signals to the terminal device.

In a case that the transmission manner of the M downlink pilot signals is semi-persistent transmission, the method may further include:

transmitting a fourth indication message to the terminal device, wherein the fourth indication message is to indicate the terminal device to stop transmitting the uplink pilot signals.

Further, the embodiment of the present disclosure may further include: transmitting a fifth indication message to the terminal device, wherein the fifth indication message is to notify the terminal device whether a transmitting beam needs to be changed when the uplink pilot signals are subsequently transmitted.

In the embodiments of the present disclosure, the base station may not transmit feedback information on a plurality of pilot signals, or may one-time transmit feedback information on a plurality of pilot signals. Therefore, unlike the related art, with the solutions in the embodiments of the present disclosure, it is not required to transmit feedback information separately for each pilot signal, thereby effectively saving signaling resources.

Figure 4:
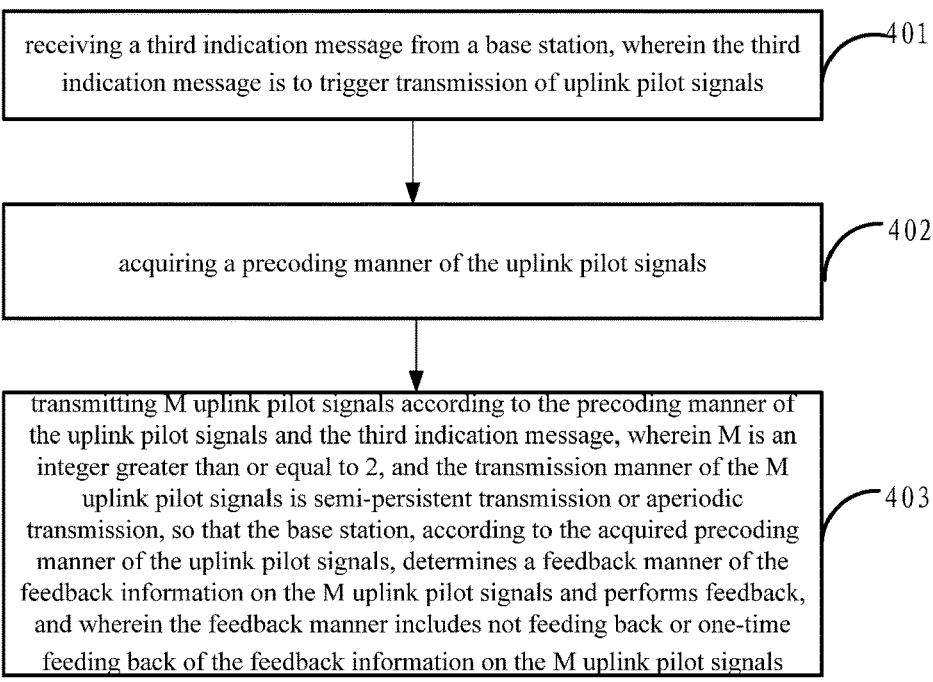
FIG. 4 is still yet another flowchart showing a signal processing method according to some embodiments of the present disclosure.

As shown in FIG. 4, an embodiment of the present disclosure provides a signal processing method, which is applied to a terminal device and includes Steps 401 to 403:

Step 401: receiving a third indication message from a base station, wherein the third indication message is to trigger transmission of uplink pilot signals.

The uplink pilot signals include but are not limited to Sounding Reference Signals (SRS).

Step 402: acquiring a precoding manner of the uplink pilot signals.

The precoding manner of the uplink pilot signals includes: using the same precoding manner for the M uplink pilot signals and using different precoding manners for the M uplink pilot signals.

Herein, the terminal device may acquire the precoding manner of the uplink pilot signals in the following ways.

including the precoding manner of the uplink pilot signals in the third indication message, and acquiring the precoding manner of the uplink pilot signals according to the third indication message; or acquiring the precoding manner of the uplink pilot signals according to a high-layer signaling; or acquiring the precoding manner of the uplink pilot signals according to a pre-agreement with the base station; or receiving the precoding manner of the uplink pilot signals transmitted by the base station; or receiving a notification signaling transmitted by the base station, and acquiring the precoding manner of the uplink pilot signals according to the notification signaling, wherein the precoding manner of the uplink pilot signals is included in the notification signaling.

In the above embodiment of the present disclosure, in a case that the transmission manner of the M uplink pilot signals is semi-persistent transmission, the method further includes:

receiving a fourth indication message transmitted by the base station, wherein the fourth indication message is to indicate the terminal device to stop transmitting the uplink pilot signals; and stop transmitting the uplink pilot signals to the base station according to the fourth indication message.

In the above embodiment, the method further includes: receiving a fifth indication message transmitted by the base station, wherein the fifth indication message is to notify whether a transmitting beam needs to be changed when the uplink pilot signals are subsequently transmitted.

In the above embodiment, the method further includes: in a case that the base station determines that the feedback manner of the feedback information on the M uplink pilot signals is one-time feeding back of the feedback information on the M uplink pilot signals, receiving the feedback information on the M uplink pilot signals transmitted by the base station, and determining an uplink transmission beam according to the feedback information on the M uplink pilot signals.

Step 403: transmitting M uplink pilot signals according to the precoding manner of the uplink pilot signals and the third indication message, where M is an integer greater than or equal to 2, and the transmission manner of the M uplink pilot signals is semi-persistent transmission or aperiodic transmission, so that the base station, according to the acquired precoding manner of the uplink pilot signals, determines a feedback manner of the feedback information on the M uplink pilot signals and performs feedback, and wherein the feedback manner includes not feeding back or one-time feeding back of the feedback information on the M uplink pilot signals.

In the embodiments of the present disclosure, the base station may not transmit feedback information on a plurality of pilot signals, or may one-time transmit feedback information on a plurality of pilot signals. Therefore, unlike the related art, with the solutions in the embodiments of the present disclosure, it is not required to transmit feedback information separately for each pilot signal, thereby effectively saving signaling resources.

Figure 5:
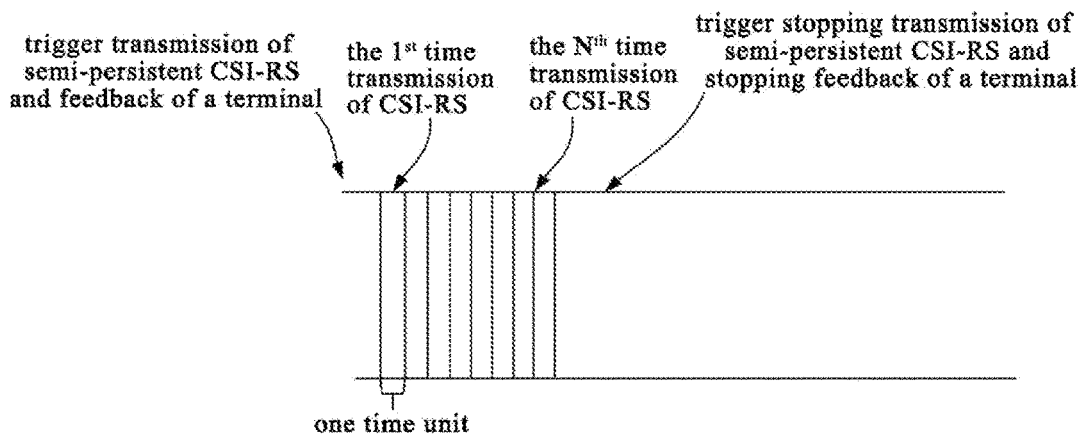
FIG. 5 is a schematic view showing signal transmission in some embodiments of the present disclosure.

In the following embodiment, a method for a base station to trigger semi-persistent CSI-RS transmission and for a terminal device to feedback is described. The specific process is as follows:

The base station transmits a command to trigger transmission of a semi-persistent CSI-RS, wherein the command instructs the terminal device to start feeding back information. After transmitting the command which triggers transmission of the semi-persistent CSI-RS, the base station transmits a semi-persistent CSI-RS. As shown in FIG. 5, after transmitting the command, the base station transmits N times of semi-persistent CSI-RS, where N is an integer greater than or equal to 2. The semi-persistent CSI-RS transmitted each time by the base station at least occupies one time unit, and the interval between the semi-persistent CSI-RSs transmitted for two times is greater than or equal to zero (0) time unit.

Each time the semi-persistent CSI-RS is transmitted, the base station may use the same precoding (transmitted in the same beam direction), or may use different precodings (transmitted in different beam directions). The information as to whether the base station uses the same precoding or different precodings may be transmitted to the terminal device together in the command which triggers transmission of the semi-persistent CSI-RS, or transmitted separately to the terminal device, or transmitted to the terminal device together with other signaling, or configured to be transmitted to the terminal device through high-layer signaling, or configured in a manner pre-agreed with the terminal device. If the base station only uses one type of precoding, then there is no need to notify the terminal device.

Thereafter, the base station transmits a command to trigger stopping the semi-persistent CSI-RS command, the transmission of the semi-persistent CSI-RS is stopped, and the terminal device is instructed to stop the feedback.

After receiving each aperiodic CSI-RS, the terminal device performs measurements separately.

According to whether the N times of semi-persistent CSI-RSs transmitted by the base station use the same precoding, the terminal device may have different processing methods:

if the N times of semi-persistent CSI-RSs transmitted by the base station use the same precoding (transmitted in the same beam direction), the terminal device will use different receiving beams to receive the semi-persistent CSI-RS, that is, a course of training the terminal device to receive beams. According to the levels of received signals, the terminal device determines the best one or more receiving beams, herein referred to as target receiving beam. The terminal device may not feedback any information to the base station, or one-time feed back information on the target receiving beam, such as a beam index or the like, according to the command which triggers stopping the semi-persistent CSI-RS; and if the N times of semi-persistent CSI-RSs transmitted by the base station use different precodings (transmitted in different beam directions), the terminal device will receive the semi-persistent CSI-RS, determine the best target receiving beam according to the levels of the received signals, and determine the target transmitting beam corresponding to the target receiving beam. The terminal device one-time feeds back relevant information on the target transmitting beam (such as a beam index) or an index of CSI-RS received by the target receiving beam, according to the command which triggers stopping the semi-persistent CSI-RS.

After receiving the feedback information from the terminal device, the base station performs downlink data transmission according to the feedback information. For example, if the terminal device feeds back one best base station transmitting beam (beam index or CSI-RS index), then when the data is subsequently transmitted, the base station will transmit data to the terminal device in the direction of the transmitting beam, thereby improving the transmission performance.

In the following embodiment, a method for a base station to trigger an aperiodic CSI-RS transmission and for a terminal device to feedback is described.

The base station transmits a command to trigger transmission of an aperiodic CSI-RS, wherein the command instructs the terminal device to start feeding back information.

Figure 6:
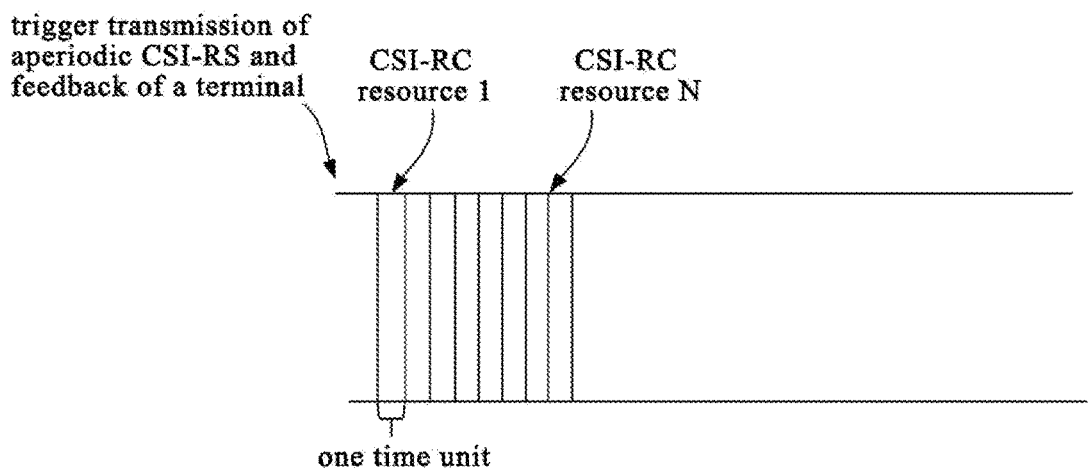
FIG. 6 is a schematic view showing signal transmission in some embodiments of the present disclosure.

The base station transmits N aperiodic CSI-RSs, where N is an integer greater than or equal to 2. As shown in FIG. 6, the base station triggers the number N of CSI-RS resources, and each CSI-RS at least occupies one time unit. The interval between two CSI-RSs is greater than or equal to zero (0) time unit. Each time the CSI-RS resource is transmitted, the base station may use the same precoding (transmitted in the same beam direction), or may use different precodings (transmitted in different beam directions). The information as to whether the base station uses the same precoding signaling or different precoding signalings may be transmitted to the terminal device together in the command which triggers transmission of the aperiodic CSI-RS, or transmitted separately to the terminal device, or transmitted to the terminal device together with other signaling, or configured to the terminal device through high-layer signaling, or configured in a manner pre-agreed with the terminal device. If the base station only uses one type of precoding, then there is no need to notify the terminal device.

After receiving each aperiodic CSI-RS, the terminal device performs measurements separately.

According to whether the aperiodic CSI-RSs transmitted by the base station use the same precoding, the terminal device may have different processing methods:

if the N aperiodic CSI-RSs transmitted by the base station use the same precoding (transmitted in the same beam direction), the terminal device will use different receiving beams to receive the aperiodic CSI-RSs, that is, a course of training the terminal device to receive beams. According to the levels of received signals, the terminal device determines the best one or more receiving beams, herein referred to as target receiving beam. The terminal device may not feedback any information to the base station, or one-time feed back information on the target receiving beam; and if the N aperiodic CSI-RSs transmitted by the base station use different precodings (transmitted in different beam directions), the terminal device will receive the aperiodic CSI-RSs, determine the best target receiving beam according to the levels of the received signals, and determine the target transmitting beam corresponding to the target receiving beam. The terminal device one-time feeds back relevant information on the target transmitting beam (such as a beam index) or an index of CSI-RS received by the target receiving beam, according to the command which triggers stopping the semi-persistent CSI-RS.

After receiving the feedback information from the terminal device, the base station performs downlink data transmission according to the feedback information. For example, if the terminal device feeds back one best base station transmitting beam (beam index or CSI-RS index), then when the data is subsequently transmitted, the base station will transmit data to the terminal device in the direction of the transmitting beam, thereby improving the transmission performance.

In the following embodiment, a method for a terminal device to transmit semi-persistent SRS and for a base station to feedback is described.

The base station transmits a command to trigger transmission of semi-persistent SRS to the terminal device. At the same time, the base station notifies the terminal device whether to transmit the semi-persistent SRS using the same precoding (beam) or different precodings (beams). Whether to use the same precoding signaling or different precoding signalings may be transmitted by the base station to the terminal device together in the command which triggers transmission of the semi-persistent SRS, or transmitted separately to the terminal device, or transmitted to the terminal device together with other signaling, or configured to the terminal device through high-layer signaling, or pre-defaulted by the base station and the terminal device. After the base station transmits a command to stop transmission of the semi-persistent SRS, the terminal device no longer transmits the semi-persistent SRS according to the received command.

Figure 7:
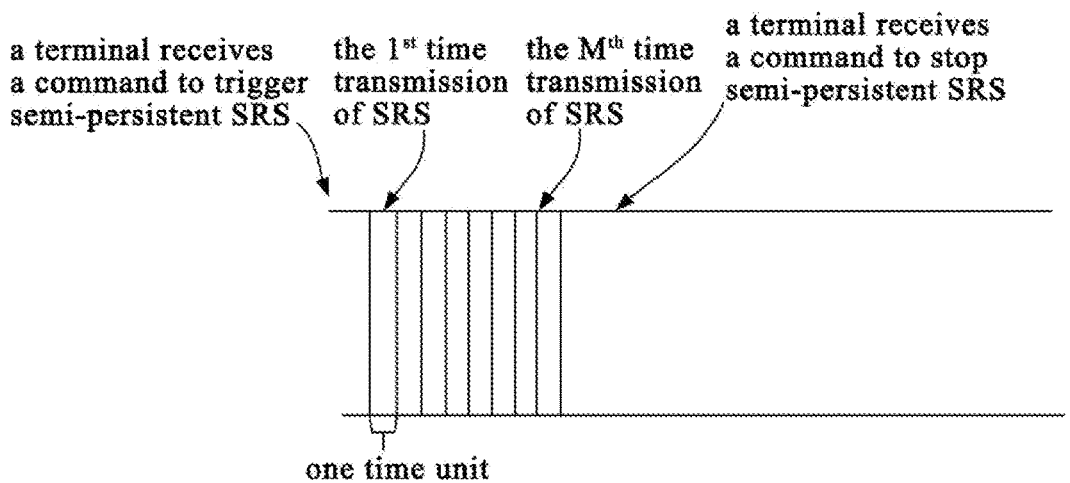
FIG. 7 is another schematic view showing signal transmission in some embodiments of the present disclosure.

The terminal device transmits the semi-persistent SRS after receiving the command to trigger the semi-persistent SRS. As shown in FIG. 7, the terminal device transmits M semi-persistent SRSs to the base station, where M is an integer greater than or equal to 2. The interval between two transmissions of SRS is greater than or equal to zero (0) time unit.

According to the indication of the base station, the terminal device may transmit the semi-persistent SRS using the same precoding (beam) or different precodings (beams).

The base station receives and measures the semi-persistent SRSs. Herein, according to the different manners in which the terminal device transmits the semi-persistent SRS, the base station may have different processing methods:

if the terminal device transmits the semi-persistent SRS by using the same precoding (beam), the base station may not feedback any information; and if the terminal device transmits the semi-persistent SRS by using different precodings (beams), the base station determines one or more target semi-persistent SRSs with the best signal quality according to a measurement result of the M semi-persistent SRSs, and one-time feeds back information of the target semi-persistent SRS to the terminal device.

In this embodiment, the base station may also transmit indication information to the terminal device to notify the terminal device whether the transmitting beam needs to be changed when the uplink pilot signals are subsequently transmitted. For example, the base station can use a beam index to indicate the terminal device whether the beam can be changed. For example, if a beam index is included in the command for triggering the semi-persistent SRS, the terminal device does not change the beam; otherwise, the beam can be changed.

In the following embodiment, a method for a terminal device to transmit aperiodic SRS and for a base station to feedback is described.

The base station transmits a command to trigger transmission of aperiodic SRS to the terminal device. At the same time, the base station notifies the terminal device whether to transmit the aperiodic SRS using the same precoding (beam) or different precodings (beams). Whether to use the same precoding signaling or different precoding signalings may be transmitted by the base station to the terminal device together in the command which triggers transmission of the aperiodic SRS, or transmitted separately to the terminal device, or transmitted to the terminal device together with other signaling, or configured to be transmitted to the terminal device through high-layer signaling, or pre-defaulted by the base station and the terminal device. After the base station transmits a command to stop transmission of the aperiodic SRS, the terminal device no longer transmits the aperiodic SRS according to the received command.

Figure 8:
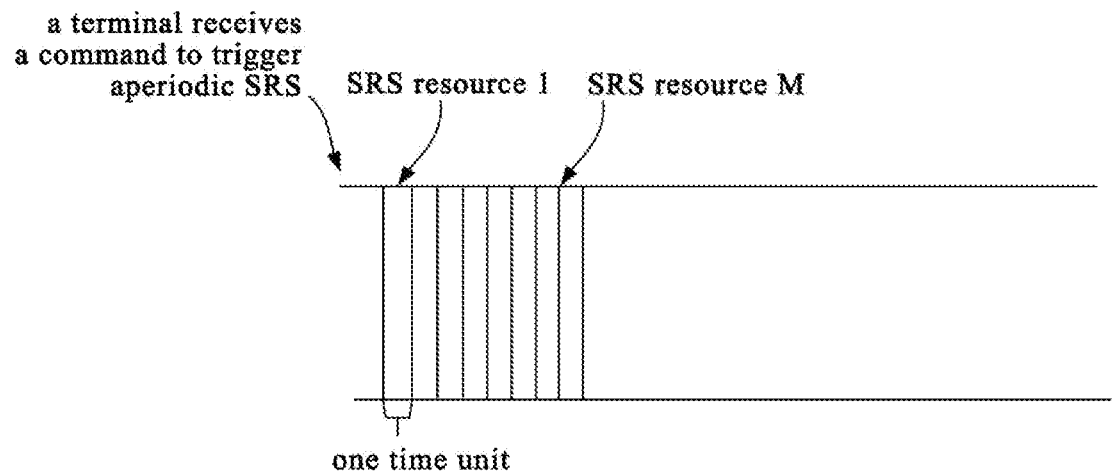
FIG. 8 is yet another schematic view showing signal transmission in some embodiments of the present disclosure.

The terminal device transmits the aperiodic SRS after receiving the command to trigger the aperiodic SRS. As shown in FIG. 8, the terminal device transmits M aperiodic SRSs to the base station, where M is an integer greater than or equal to 2. The interval between two transmissions of SRS is greater than or equal to zero (0) time unit.

According to the indication of the base station, the terminal device may transmit the aperiodic SRS using the same precoding (beam) or different precodings (beams).

The base station receives and measures the aperiodic SRSs. Herein, according to the different manners in which the terminal device transmits the aperiodic SRS, the base station may have different processing methods:

if the terminal device transmits the aperiodic SRS by using the same precoding (beam), the base station may not feedback any information; and if the terminal device transmits the aperiodic SRS by using different precodings (beams), the base station determines one or more target aperiodic SRSs with the best signal quality according to a measurement result of the M aperiodic SRSs, and one-time feeds back information of the target semi-persistent SRS to the terminal device.

In this embodiment, the base station may also transmit indication information to the terminal device to notify the terminal device whether the transmitting beam needs to be changed when the uplink pilot signals are subsequently transmitted. For example, the base station can use a beam index to indicate the terminal device whether the beam can be changed. For example, if a beam index is included in the command for triggering the aperiodic SRS, the terminal device does not change the beam; otherwise, the beam can be changed.

Figure 9:
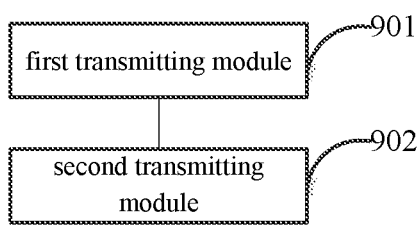
FIG. 9 is a schematic view showing a signal processing device according to some embodiments of the present disclosure.

As shown in FIG. 9, an embodiment of the present disclosure provides a signal processing device, which includes:

a first transmitting module 901, configured to transmit a first indication message to a terminal device, wherein the first indication message is to trigger the terminal device to transmit feedback information on pilot signals; and a second transmitting module 902, configured to transmit N downlink pilot signals to the terminal device, where N is an integer greater than or equal to 2, and the transmission manner of the N downlink pilot signals is semi-persistent transmission or aperiodic transmission, so that the terminal device, according to an acquired precoding manner of the downlink pilot signals and the first indication message, determines a feedback manner of the feedback information on the N downlink pilot signals and performs feedback, and wherein the feedback manner includes not feeding back or one-time feeding back of the feedback information on the N downlink pilot signals.

The precoding manner of the downlink pilot signals includes: using the same precoding manner for the N downlink pilot signals and using different precoding manners for the N downlink pilot signals.

Figure 10:
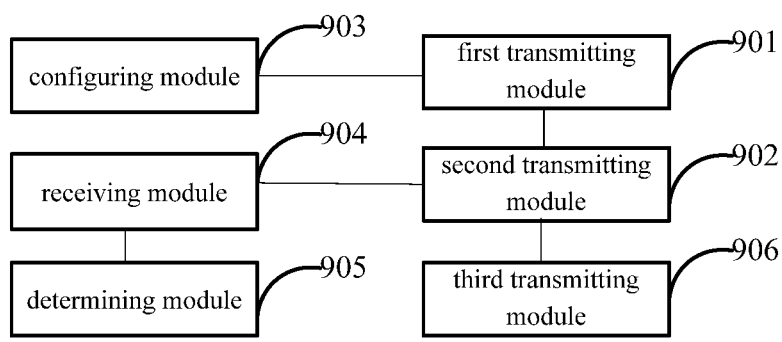
FIG. 10 is a structural view showing a signal processing device according to some embodiments of the present disclosure.

As shown in FIG. 10, the device further includes: a configuring module 903, configured to include the precoding manner of the downlink pilot signals in the first indication message; or configure the precoding manner of the downlink pilot signals to the terminal device by using a high-layer signaling; or transmit the precoding manner of the downlink pilot signals to the terminal device; or transmit a notification signaling to the terminal device, wherein the notification signaling includes the precoding manner of the downlink pilot signals; or pre-agree the precoding manner of the downlink pilot signals with the terminal device.

As shown in FIG. 10, the device further includes: a receiving module 904, configured to, in a case that the terminal device determines that the feedback manner of the feedback information on the N downlink pilot signals is one-time feeding back of the feedback information on the N downlink pilot signals, receive the feedback information on the N downlink pilot signals from the terminal device; and a determining module 905, configured to determine a downlink transmission beam according to the feedback information on the N downlink pilot signals.

As shown in FIG. 10, the device further includes: a third transmitting module 906 configured to, in a case that the transmission manner of the N downlink pilot signals is semi-persistent transmission and the feedback manner is one-time feeding back of the feedback information on the N downlink pilot signals, transmit a second indication message to the terminal device, wherein the second indication message is to indicate the terminal device to stop transmitting the feedback information on the pilot signals.

For the operational principle of the device of the present disclosure, reference may be made to the above method embodiments, and the device may be located in the base station.

In the embodiments of the present disclosure, the terminal device may not transmit feedback information on a plurality of pilot signals, or may one-time transmit feedback information on a plurality of pilot signals. Therefore, unlike the related art, with the solutions in the embodiments of the present disclosure, it is not required to transmit feedback information separately for each pilot signal, thereby effectively saving signaling resources.

Figure 11:
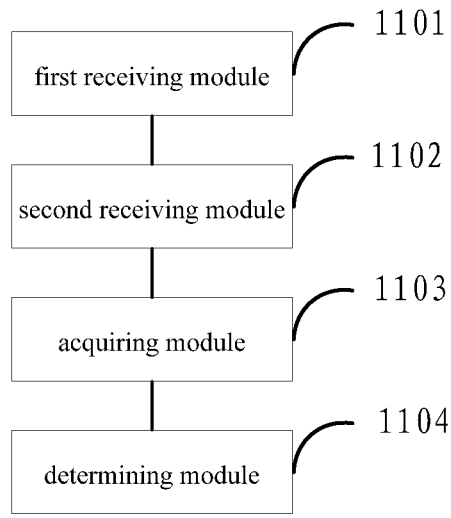
FIG. 11 is another schematic view showing a signal processing device according to some embodiments of the present disclosure.

As shown in FIG. 11, an embodiment of the present disclosure provides a signal processing device, which includes:

a first receiving module 1101, configured to receive a first indication message from a base station, wherein the first indication message is to trigger transmission of feedback information on pilot signals; a second receiving module 1102, configured to receive N downlink pilot signals transmitted by the base station, and measure the N downlink pilot signals respectively, where N is an integer greater than or equal to 2, and the transmission manner of the N downlink pilot signals is semi-persistent transmission or aperiodic transmission; an acquiring module 1103, configured to acquire a precoding manner of the downlink pilot signals; and a determining module 1104, configured to determine a feedback manner of the feedback information on the N downlink pilot signals and perform feedback, according to the precoding manner of the downlink pilot signals, wherein the feedback manner includes not feeding back or one-time feeding back of the feedback information on the N downlink pilot signals.

The precoding manner of the downlink pilot signals includes: using the same precoding manner for the N downlink pilot signals and using different precoding manners for the N downlink pilot signals, and the acquiring module 1103 is specifically configured to:

acquire the precoding manner of the downlink pilot signals according to the first indication message, wherein the precoding manner of the downlink pilot signals is included in the first indication message; or acquire the precoding manner of the downlink pilot signals by using a high-layer signaling; or acquire the precoding manner of the downlink pilot signals according to a pre-agreement with the base station; or receive the precoding manner of the downlink pilot signals transmitted by the base station; or receive a notification signaling transmitted by the base station, and acquire the precoding manner of the downlink pilot signals according to the notification signaling, wherein the precoding manner of the downlink pilot signals is included in the notification signaling.

The determining module 1104 is specifically configured to:

in a case that the same precoding manner is used for the N downlink pilot signals, if not feeding back is determined according to the notification of the base station or a pre-agreement with the base station, determine that the feedback manner of the feedback information on the N downlink pilot signals is not feeding back; or in a case that the same precoding manner is used for the N downlink pilot signals, if one-time feeding back is determined to be required according to the notification of the base station or a pre-agreement with the base station, determine one or more target receiving beams with the best signal receiving quality from receiving beams which receive the N downlink pilot signals, according to a measurement result of the N downlink pilot signals, and one-time feed back information on the target receiving beams to the base station; or in a case that different precoding manners are used for the N downlink pilot signals, determine one or more target receiving beams with the best signal receiving quality from receiving beams which receive the N downlink pilot signals, according to a measurement result of the N downlink pilot signals, determine target transmitting beams corresponding to the target receiving beams, and one-time feed back information on the target transmitting beams or information on the downlink pilot signals received by the target receiving beams to the base station.

Figure 12:
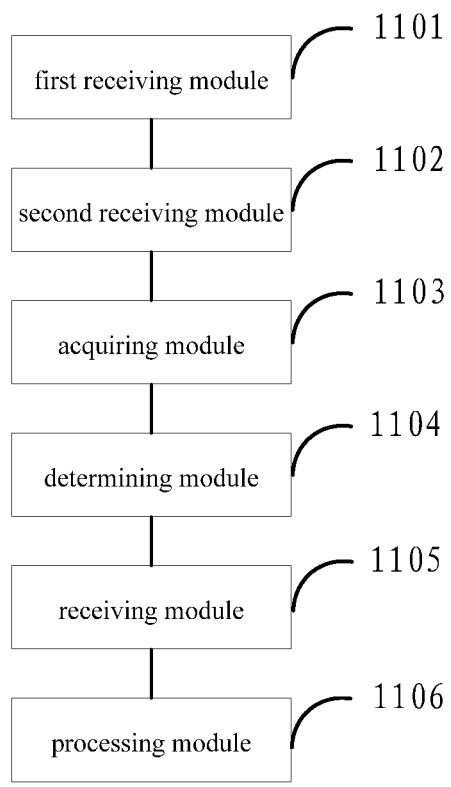
FIG. 12 is another structural view showing a signal processing device according to some embodiments of the present disclosure.

As shown in FIG. 12, the device further includes: a receiving module 1105 configured to, in a case that the transmission manner of the N downlink pilot signals is semi-persistent transmission and the feedback manner is one-time feeding back of the feedback information on the N downlink pilot signals, receive a second indication message from the base station, wherein the second indication message is to indicate to stop transmitting the feedback information on the pilot signals; and a processing module 1106, configured to stop transmitting the feedback information on the pilot signals to the base station according to the second indication message.

For the operational principle of the device of the present disclosure, reference may be made to the above method embodiments, and the device may be located in the terminal device.

In the embodiments of the present disclosure, the terminal device may not transmit feedback information on a plurality of pilot signals, or may one-time transmit feedback information on a plurality of pilot signals. Therefore, unlike the related art, with the solutions in the embodiments of the present disclosure, it is not required to transmit feedback information separately for each pilot signal, thereby effectively saving signaling resources.

Figure 13:
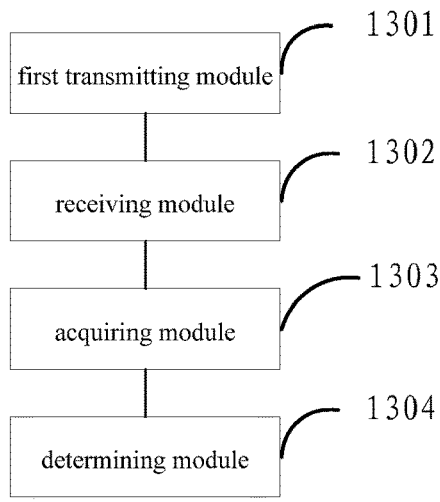
FIG. 13 is yet another schematic view showing a signal processing device according to some embodiments of the present disclosure.

As shown in FIG. 13, an embodiment of the present disclosure provides a signal processing device, which includes:

a first transmitting module 1301, configured to transmit a third indication message to a terminal device, wherein the third indication message is to trigger the terminal device to transmit uplink pilot signals; a receiving module 1302, configured to receive M uplink pilot signals transmitted by the terminal device according to an acquired precoding manner of the uplink pilot signals, and measure the M uplink pilot signals respectively, where M is an integer greater than or equal to 2, and the transmission manner of the M uplink pilot signals is semi-persistent transmission or aperiodic transmission; an acquiring module 1303, configured to acquire a precoding manner of the M uplink pilot signals; and a determining module 1304, configured to determine a feedback manner of the feedback information on the M uplink pilot signals and perform feedback, according to the precoding manner of the uplink pilot signals, wherein the feedback manner includes not feeding back or one-time feeding back of the feedback information on the M uplink pilot signals.

The precoding manner of the uplink pilot signals includes: using the same precoding manner for the M uplink pilot signals and using different precoding manners for the M uplink pilot signals; the precoding manner of the uplink pilot signals is included in the third indication message.

Figure 14:
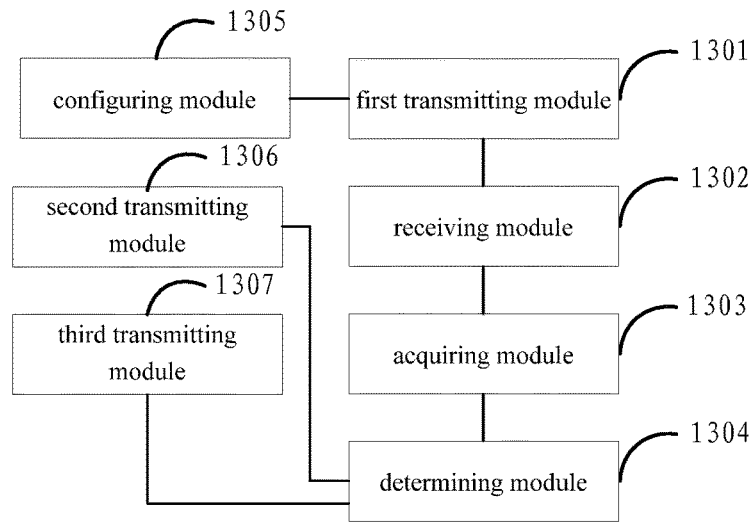
FIG. 14 is yet another structural view showing a signal processing device according to some embodiments of the present disclosure.

As shown in FIG. 14, the device further includes: a configuring module 1305, configured to include the precoding manner of the uplink pilot signals in the third indication message, or configure the precoding manner of the uplink pilot signals to the terminal device by using a high-layer signaling, or transmit the precoding manner of the uplink pilot signals to the terminal device, or transmit a notification signaling to the terminal device, wherein the notification signaling includes the precoding manner of the uplink pilot signals, or pre-agree the precoding manner of the uplink pilot signals with the terminal device.

The determining module 1304 is specifically configured to: in a case that the same precoding manner is used for the M uplink pilot signals, determine that the feedback manner of the feedback information on the M uplink pilot signals is not feeding back; or in a case that different precoding manners are used for the M uplink pilot signals, determine one or more target uplink pilot signals with the best signal quality according to a measurement result of the M uplink pilot signals, and one-time feed back information on the target uplink pilot signals to the terminal device.

As shown in FIG. 14, the device further includes:

a second transmitting module 1306 configured to: in a case that the transmission manner of the M downlink pilot signals is semi-persistent transmission, transmit a fourth indication message to the terminal device, wherein the fourth indication message is to indicate the terminal device to stop transmitting the uplink pilot signals.

As shown in FIG. 14, the device further includes:

a third transmitting module 1307 configured to transmit a fifth indication message to the terminal device, wherein the fifth indication message is to notify the terminal device whether a transmitting beam needs to be changed when the uplink pilot signals are subsequently transmitted.

For the operational principle of the device of the present disclosure, reference may be made to the above method embodiments, and the device may be located in the base station.

In the embodiments of the present disclosure, the base station may not transmit feedback information on a plurality of pilot signals, or may one-time transmit feedback information on a plurality of pilot signals. Therefore, unlike the related art, with the solutions in the embodiments of the present disclosure, it is not required to transmit feedback information separately for each pilot signal, thereby effectively saving signaling resources.

Figure 15:
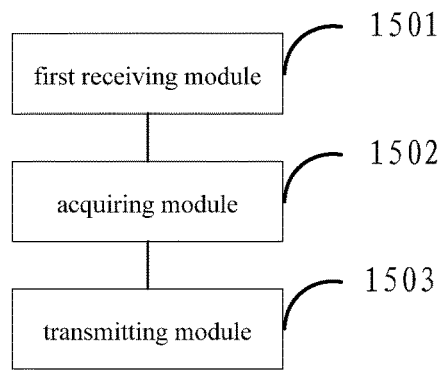
FIG. 15 is still yet another schematic view showing a signal processing device according to some embodiments of the present disclosure.

As shown in FIG. 15, an embodiment of the present disclosure provides a signal processing device, which includes:

a first receiving module 1501, configured to receive a third indication message from a base station, wherein the third indication message is to trigger transmission of uplink pilot signals; an acquiring module 1502, configure to acquire a precoding manner of the uplink pilot signals; and a transmitting module 1503, configured to transmit M uplink pilot signals according to the precoding manner of the uplink pilot signals and the third indication message, where M is an integer greater than or equal to 2, and the transmission manner of the M uplink pilot signals is semi-persistent transmission or aperiodic transmission, so that the base station, according to the acquired precoding manner of the uplink pilot signals, determines a feedback manner of the feedback information on the M uplink pilot signals and performs feedback, and wherein the feedback manner includes not feeding back or one-time feeding back of the feedback information on the M uplink pilot signals.

The precoding manner of the uplink pilot signals includes: using the same precoding manner for the M uplink pilot signals and using different precoding manners for the M uplink pilot signals; and the acquiring module 1502 is specifically configured to:

acquire the precoding manner of the uplink pilot signals according to the third indication message, wherein the precoding manner of the uplink pilot signals is included in the third indication message; or acquire the precoding manner of the uplink pilot signals according to a high-layer signaling; or acquire the precoding manner of the uplink pilot signals according to a pre-agreement with the base station; or receive the precoding manner of the uplink pilot signals transmitted by the base station; or receive a notification signaling transmitted by the base station, and acquire the precoding manner of the uplink pilot signals according to the notification signaling, wherein the precoding manner of the uplink pilot signals is included in the notification signaling.

Figure 16:
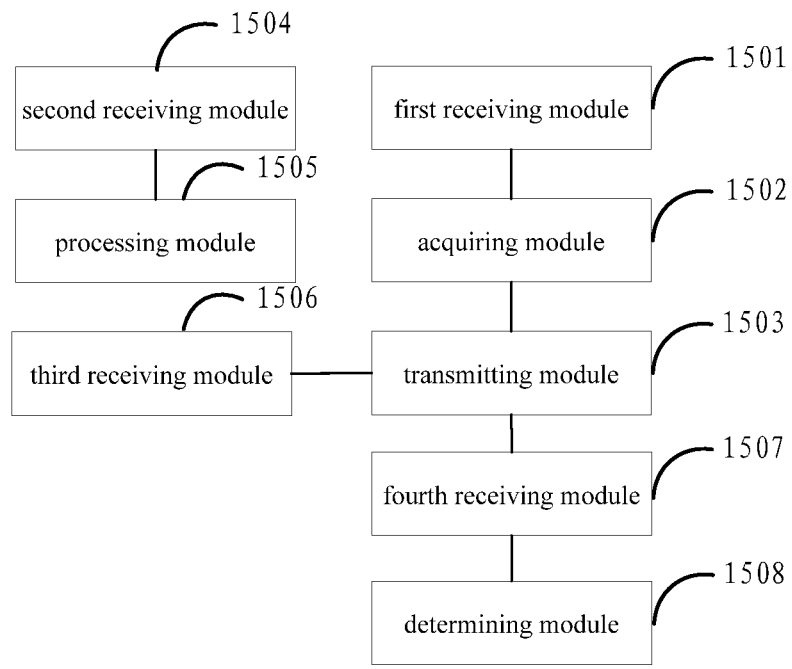
FIG. 16 is still yet another structural view showing a signal processing device according to some embodiments of the present disclosure.

As shown in FIG. 16, the device further includes a second receiving module 1504 configured to: in a case that the transmission manner of the M uplink pilot signals is semi-persistent transmission, receive a fourth indication message transmitted by the base station, wherein the fourth indication message is to indicate stop transmitting the uplink pilot signals; and a processing module 1505, configured to stop transmitting the uplink pilot signals to the base station according to the fourth indication message.

As shown in FIG. 16, the device further includes a third receiving module 1506 configured to receive a fifth indication message transmitted by the base station, wherein the fifth indication message is to notify whether a transmitting beam needs to be changed when the uplink pilot signals are subsequently transmitted.

As shown in FIG. 16, the device further includes a fourth receiving module 1507 configured to: in a case that the base station determines that the feedback manner of the feedback information on the M uplink pilot signals is one-time feeding back of the feedback information on the M uplink pilot signals, receive the feedback information on the M uplink pilot signals transmitted by the base station; and a determining module 1508, configured to determine an uplink transmission beam according to the feedback information on the M uplink pilot signals.

For the operational principle of the device of the present disclosure, reference may be made to the above method embodiments, and the device may be located in the base station.

In the embodiments of the present disclosure, the base station may not transmit feedback information on a plurality of pilot signals, or may one-time transmit feedback information on a plurality of pilot signals. Therefore, unlike the related art, with the solutions in the embodiments of the present disclosure, it is not required to transmit feedback information separately for each pilot signal, thereby effectively saving signaling resources.

Figure 17:
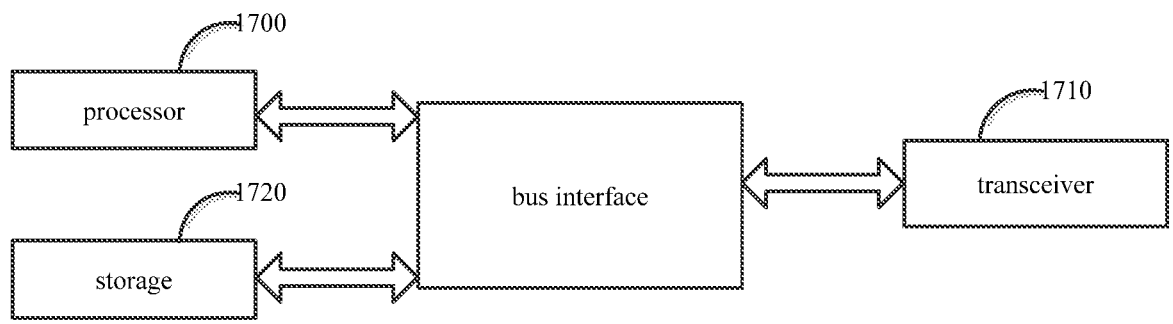
FIG. 17 is a schematic view showing a base station according to some embodiments of the present disclosure.

As shown in FIG. 17, an embodiment of the present disclosure provides a base station, which includes: a processor 1700 configured to read a program in a storage 1720 and execute the following processes:

transmitting a first indication message to a terminal device, wherein the first indication message is to trigger the terminal device to transmit feedback information on pilot signals; and transmitting N downlink pilot signals to the terminal device, where N is an integer greater than or equal to 2, and the transmission manner of the N downlink pilot signals is semi-persistent transmission or aperiodic transmission, so that the terminal device, according to an acquired precoding manner of the downlink pilot signals and the first indication message, determines a feedback manner of the feedback information on the N downlink pilot signals and performs feedback, and wherein the feedback manner includes not feeding back or one-time feeding back of the feedback information on the N downlink pilot signals; and a transceiver 1710, configured to receive and transmit data under the control of the processor 1700.

In FIG. 17, a bus architecture may include any number of interconnected buses and bridges. Specifically, various circuits including one or more processors represented by the processor 1700 and storages represented by the storage 1720 are linked together by the bus architecture. The bus architecture may also link various other circuits together, such as peripherals, voltage regulators, and power management circuits, as is known in the art. Therefore, no further description is given herein. The bus interface provides an interface. The transceiver 1710 may be a plurality of elements, including receivers and transmitters, which provide a unit for communicating with various other devices over a transmission medium. The processor 1700 is responsible for managing the bus architecture and the normal processing, and the storage 1720 may store data used by the processor 1700 in performing operations.

The processor 1700 is responsible for managing the bus architecture and the normal processing, and the storage 1720 may store data used by the processor 1700 in performing operations.

The precoding manner of the downlink pilot signals includes: using the same precoding manner for the N downlink pilot signals and using different precoding manners for the N downlink pilot signals.

The processor 1700 is further configured to notify the precoding manner of the downlink pilot signals in the following manner:

including the precoding manner of the downlink pilot signals in the first indication message, and notifying the precoding manner of the downlink pilot signals by the first indication message; or configuring the precoding manner of the downlink pilot signals to the terminal device by using a high-layer signaling; or transmitting the precoding manner of the downlink pilot signals to the terminal device; or transmitting a notification signaling to the terminal device, wherein the notification signaling includes the precoding manner of the downlink pilot signals; or pre-agreeing the precoding manner of the downlink pilot signals with the terminal device.

The processor 1700 is further configured to: receive the feedback information on the N downlink pilot signals from the terminal device; and determine a downlink transmission beam according to the feedback information on the N downlink pilot signals.

The processor 1700 is further configured to: in a case that the transmission manner of the N downlink pilot signals is semi-persistent transmission and the feedback manner is one-time feeding back of the feedback information on the N downlink pilot signals, transmit a second indication message to the terminal device, wherein the second indication message is to indicate the terminal device to stop transmitting the feedback information on the pilot signals.

Figure 18:
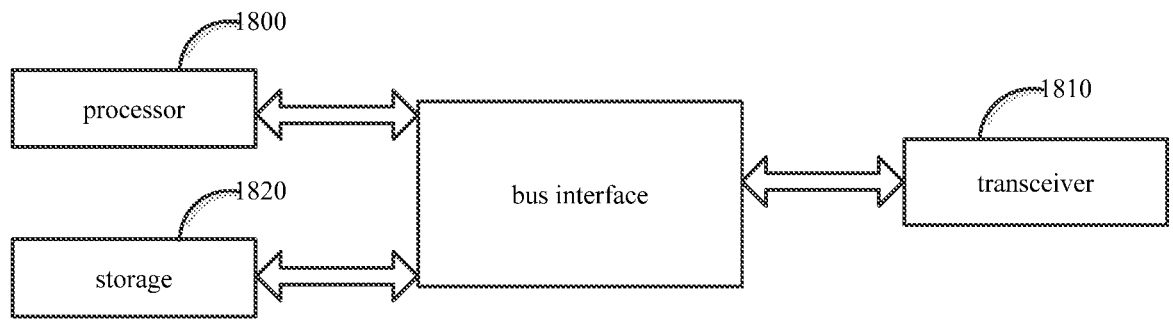
FIG. 18 is another schematic view showing a base station according to some embodiments of the present disclosure.

As shown in FIG. 18, an embodiment of the present disclosure provides a base station, which includes: a processor 1800 configured to read a program in a storage 1820 and execute the following process:

transmitting a third indication message to a terminal device, wherein the third indication message is to trigger the terminal device to transmit uplink pilot signals; receiving M uplink pilot signals transmitted by the terminal device according to an acquired precoding manner of the uplink pilot signals, and measuring the M uplink pilot signals respectively, where M is an integer greater than or equal to 2, and the transmission manner of the M uplink pilot signals is semi-persistent transmission or aperiodic transmission; acquiring a precoding manner of the M uplink pilot signals; and determining a feedback manner of the feedback information on the M uplink pilot signals and performing feedback, according to the precoding manner of the uplink pilot signals, wherein the feedback manner includes not feeding back or one-time feeding back of the feedback information on the M uplink pilot signals; and a transceiver 1810, configured to receive and transmit data under the control of the processor 1800.

In FIG. 18, a bus architecture may include any number of interconnected buses and bridges. Specifically, various circuits including one or more processors represented by the processor 1800 and storages represented by the storage 1820 are linked together by the bus architecture. The bus architecture may also link various other circuits together, such as peripherals, voltage regulators, and power management circuits, as is known in the art. Therefore, no further description is given herein. The bus interface provides an interface. The transceiver 1810 may be a plurality of elements, including receivers and transmitters, which provide a unit for communicating with various other devices over a transmission medium. The processor 1800 is responsible for managing the bus architecture and the normal processing, and the storage 1820 may store data used by the processor 1800 in performing operations.

The processor 1800 is responsible for managing the bus architecture and the normal processing, and the storage 1820 may store data used by the processor 1800 in performing operations.

The precoding manner of the uplink pilot signals includes: using the same precoding manner for the M uplink pilot signals and using different precoding manners for the M uplink pilot signals.

The processor 1800 is further configured to: include the precoding manner of the uplink pilot signals in the third indication message, and notify the precoding manner of the uplink pilot signals by the third indication message; or configure the precoding manner of the uplink pilot signals to the terminal device by using a high-layer signaling; or transmit the precoding manner of the uplink pilot signals to the terminal device; or transmit a notification signaling to the terminal device, wherein the notification signaling includes the precoding manner of the uplink pilot signals; or pre-agree the precoding manner of the uplink pilot signals with the terminal device.

The processor 1800 is further configured to: in a case that the same precoding manner is used for the M uplink pilot signals, determine that the feedback manner of the feedback information on the M uplink pilot signals is not feeding back; or in a case that different precoding manners are used for the M uplink pilot signals, determine one or more target uplink pilot signals with the best signal quality according to a measurement result of the M uplink pilot signals, and one-time feed back information on the target uplink pilot signals to the terminal device.

The processor 1800 is further configured to transmit a fourth indication message to the terminal device, wherein the fourth indication message is to indicate the terminal device to stop transmitting the uplink pilot signals.

The processor 1800 is further configured to transmitting a fifth indication message to the terminal device, wherein the fifth indication message is to notify the terminal device whether a transmitting beam needs to be changed when the uplink pilot signals are subsequently transmitted.

In FIG. 18, a bus architecture may include any number of interconnected buses and bridges. Specifically, various circuits including one or more processors represented by the processor 1800 and storages represented by the storage 1820 are linked together by the bus architecture. The bus architecture may also link various other circuits together, such as peripherals, voltage regulators, and power management circuits, as is known in the art. Therefore, no further description is given herein. The bus interface provides an interface. The transceiver 1810 may be a plurality of elements, including receivers and transmitters, which provide a unit for communicating with various other devices over a transmission medium. The processor 1800 is responsible for managing the bus architecture and the normal processing, and the storage 1820 may store data used by the processor 1800 in performing operations.

The processor 1800 is responsible for managing the bus architecture and the normal processing, and the storage 1820 may store data used by the processor 1800 in performing operations.

The processor 1800 is further configured to execute the steps of the embodiment shown in FIG. 3.

Figure 19:
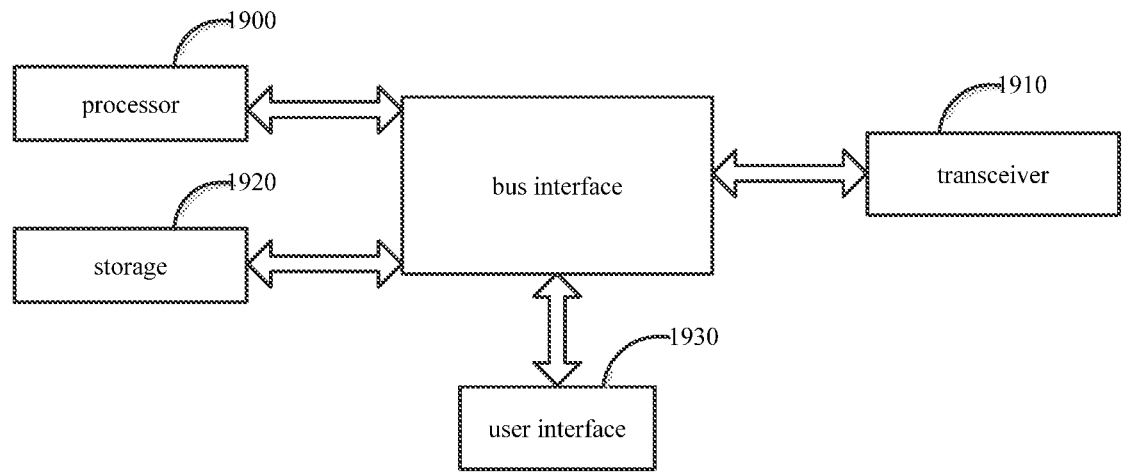
FIG. 19 is a schematic view showing a terminal device according to some embodiments of the present disclosure.

As shown in FIG. 19, an embodiment of the present disclosure provides a terminal device, which includes: a processor 1900 configured to read a program in a storage 1920 and execute the following process:

receiving a first indication message from a base station, wherein the first indication message is to trigger transmission of feedback information on pilot signals; receiving N downlink pilot signals transmitted by the base station, and measuring the N downlink pilot signals respectively, where N is an integer greater than or equal to 2, and the transmission manner of the N downlink pilot signals is semi-persistent transmission or aperiodic transmission; acquiring a precoding manner of the downlink pilot signals; and determining a feedback manner of the feedback information on the N downlink pilot signals and performing feedback, according to the precoding manner of the downlink pilot signals, wherein the feedback manner includes not feeding back or one-time feeding back of the feedback information on the N downlink pilot signals; and a transceiver 1910, configured to receive and transmit data under the control of the processor 1900.

In FIG. 19, a bus architecture may include any number of interconnected buses and bridges. Specifically, various circuits including one or more processors represented by the processor 1900 and storages represented by the storage 1920 are linked together by the bus architecture. The bus architecture may also link various other circuits together, such as peripherals, voltage regulators, and power management circuits, as is known in the art. Therefore, no further description is given herein. The bus interface provides an interface. The transceiver 1910 may be a plurality of elements, including receivers and transmitters, which provide a unit for communicating with various other devices over a transmission medium. For different user devices, a user interface 1930 may also be an interface capable of externally or internally connecting with a required device which includes but is not limited to a keypad, a display, a speaker, a microphone, a joystick, etc.

The processor 1900 is responsible for managing the bus architecture and the normal processing, and the storage 1920 may store data used by the processor 1900 in performing operations.

The precoding manner of the downlink pilot signals includes: using the same precoding manner for the N downlink pilot signals and using different precoding manners for the N downlink pilot signals The processor 1900 is further configured to: acquire the precoding manner of the downlink pilot signals according to the first indication message, wherein the precoding manner of the downlink pilot signals is included in the first indication message; or acquire the precoding manner of the downlink pilot signals by using a high-layer signaling; or acquire the precoding manner of the downlink pilot signals according to a pre-agreement with the base station; or receive the precoding manner of the downlink pilot signals transmitted by the base station; or receive a notification signaling transmitted by the base station, and acquire the precoding manner of the downlink pilot signals according to the notification signaling, wherein the precoding manner of the downlink pilot signals is included in the notification signaling.

The processor 1900 is further configured to: in a case that the same precoding manner is used for the N downlink pilot signals, if not feeding back is determined according to the notification of the base station or a pre-agreement with the base station, determine that the feedback manner of the feedback information on the N downlink pilot signals is not feeding back; or in a case that the same precoding manner is used for the N downlink pilot signals, if the one-time feeding back is determined to be required according to the notification of the base station or a pre-agreement with the base station, determine one or more target receiving beams with the best signal receiving quality from receiving beams which receive the N downlink pilot signals, according to a measurement result of the N downlink pilot signals, and one-time feed back information on the target receiving beams to the base station; or in a case that different precoding manners are used for the N downlink pilot signals, determine one or more target receiving beams with the best signal receiving quality from receiving beams which receive the N downlink pilot signals, according to a measurement result of the N downlink pilot signals, determine target transmitting beams corresponding to the target receiving beams, and one-time feed back information on the target transmitting beams or information on the downlink pilot signals received by the target receiving beams to the base station.

The processor 1900 is further configured to: receive a second indication message from the base station, wherein the second indication message is to indicate to stop transmitting the feedback information on the pilot signals; and stopping transmitting the feedback information on the pilot signals to the base station according to the second indication message.

Figure 20:
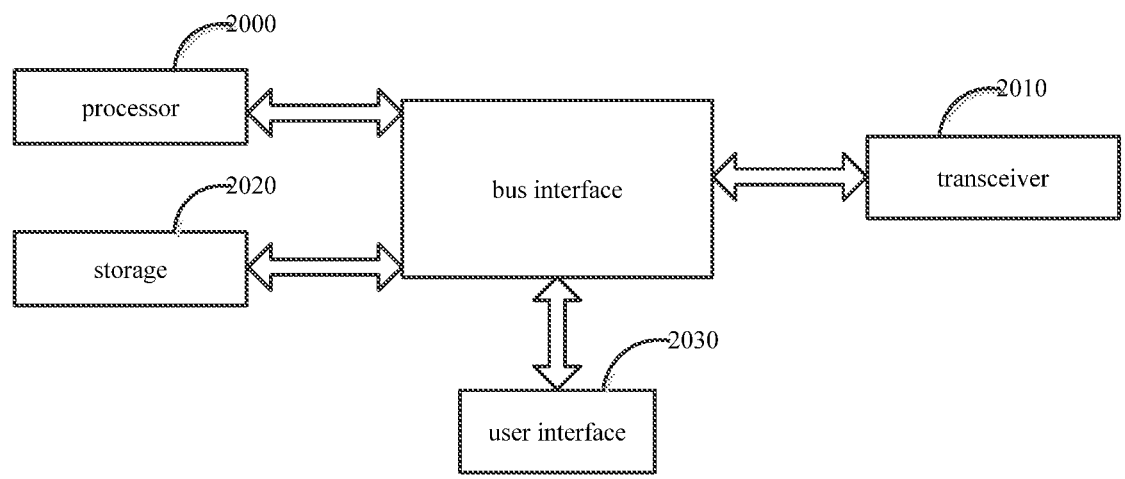
FIG. 20 is another schematic view showing a terminal device according to some embodiments of the present disclosure.

As shown in FIG. 20, an embodiment of the present disclosure provides a terminal device, which includes: a processor 2000 configured to read a program in a storage 2020 and execute the following process:

receiving a third indication message from a base station, wherein the third indication message is to trigger transmission of uplink pilot signals; acquiring a precoding manner of the uplink pilot signals; and transmitting M uplink pilot signals according to the precoding manner of the uplink pilot signals and the third indication message, where M is an integer greater than or equal to 2, and the transmission manner of the M uplink pilot signals is semi-persistent transmission or aperiodic transmission, so that the base station, according to the acquired precoding manner of the uplink pilot signals, determines a feedback manner of the feedback information on the M uplink pilot signals and performs feedback, and wherein the feedback manner includes not feeding back or one-time feeding back of the feedback information on the M uplink pilot signals; and a transceiver 2010, configured to receive and transmit data under the control of the processor 2000.

In FIG. 20, a bus architecture may include any number of interconnected buses and bridges. Specifically, various circuits including one or more processors represented by the processor 2000 and storages represented by the storage 2020 are linked together by the bus architecture. The bus architecture may also link various other circuits together, such as peripherals, voltage regulators, and power management circuits, as is known in the art. Therefore, no further description is given herein. The bus interface provides an interface. The transceiver 2010 may be a plurality of elements, including receivers and transmitters, which provide a unit for communicating with various other devices over a transmission medium. For different user devices, a user interface 2030 may also be an interface capable of externally or internally connecting with a required device which includes but is not limited to a keypad, a display, a speaker, a microphone, a joystick, etc.

The processor 2000 is responsible for managing the bus architecture and the normal processing, and the storage 2020 may store data used by the processor 2000 in performing operations.

The processor 2000 is further configured to: acquire the precoding manner of the uplink pilot signals according to the third indication message, wherein the precoding manner of the uplink pilot signals is included in the third indication message; or acquire the precoding manner of the uplink pilot signals according to a high-layer signaling; or acquire the precoding manner of the uplink pilot signals according to a pre-agreement with the base station; or receive the precoding manner of the uplink pilot signals transmitted by the base station; or receive a notification signaling transmitted by the base station, and acquire the precoding manner of the uplink pilot signals according to the notification signaling, wherein the precoding manner of the uplink pilot signals is included in the notification signaling.

The processor 2000 is further configured to: receive a fourth indication message transmitted by the base station, wherein the fourth indication message is to indicate the terminal device to stop transmitting the uplink pilot signals; and stop transmitting the uplink pilot signals to the base station according to the fourth indication message.

The processor 2000 is further configured to: receive a fifth indication message transmitted by the base station, wherein the fifth indication message is to notify whether a transmitting beam needs to be changed when the uplink pilot signals are subsequently transmitted.

The processor 2000 is further configured to: receive the feedback information on the M uplink pilot signals transmitted by the base station; and determine an uplink transmission beam according to the feedback information on the M uplink pilot signals.

An embodiment of the present disclosure further provides a storage medium configured to store a computer program which is capable of being executed by a processor to implement the above signal processing methods.

In some embodiments of the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may also be integrated into one unit. The above integrated unit can be implemented in the form of hardware or in the form of hardware plus software functional units.

The above described integrated unit implemented in the form of a software functional unit can be stored in a computer readable storage medium. The software functional unit is stored in a storage medium which includes a plurality of instructions for causing a computer device (which may be a personal computer, a server, or a network device, etc.) to execute part of the steps of the transceiving methods of the various embodiments of the present disclosure. The foregoing storage medium includes: a U disk, a mobile hard disk, a Read-Only Memory (ROM), a Random-Access Memory (RAM), a magnetic disk or an optical disk, and various media that can store program codes thereon.

Described above are preferred embodiments of the present disclosure, and it should be noted that those skilled in the art can also make several improvements and modifications without departing from the principles of the present disclosure, which will also fall within the scope of protection of the present disclosure.

What is claimed is:

1. A signal processing method, which is applied to a terminal device, the method comprising:
receiving a first indication message from a base station, wherein the first indication message is to trigger transmission of feedback information on pilot signals;
receiving N downlink pilot signals transmitted by the base station, and measuring the N downlink pilot signals respectively, where N is an integer greater than or equal to 2, and the transmission manner of the N downlink pilot signals is semi-persistent transmission or aperiodic transmission;
acquiring a precoding manner of the downlink pilot signals; and
determining a feedback manner of the feedback information on the N downlink pilot signals and performing feedback, according to the precoding manner of the downlink pilot signals, wherein the feedback manner comprises not feeding back or one-time feeding back of the feedback information on the N downlink pilot signals,
wherein the precoding manner of the downlink pilot signals comprises: using the same precoding manner for the N downlink pilot signals and using different precoding manners for the N downlink pilot signals.

2. The method according to claim 1, wherein the acquiring the precoding manner of the downlink pilot signals comprises:
acquiring the precoding manner of the downlink pilot signals according to the first indication message, wherein the precoding manner of the downlink pilot signals is included in the first indication message; or
acquiring the precoding manner of the downlink pilot signals by using a high-layer signaling; or
acquiring the precoding manner of the downlink pilot signals according to a pre-agreement with the base station; or
receiving the precoding manner of the downlink pilot signals transmitted by the base station; or
receiving a notification signaling transmitted by the base station, and acquiring the precoding manner of the downlink pilot signals according to the notification signaling, wherein the precoding manner of the downlink pilot signals is included in the notification signaling.

3. The method according to claim 1, wherein the precoding manner of the downlink pilot signals comprises: using the same precoding manner for the N downlink pilot signals and using different precoding manners for the N downlink pilot signals, and
the determining the feedback manner of the feedback information on the N downlink pilot signals and performing feedback according to the precoding manner of the downlink pilot signals comprises:
determining that the feedback manner of the feedback information on the N downlink pilot signals is not feeding back, in a case that the same precoding manner is used for the N downlink pilot signals, if not feeding back is determined according to the notification of the base station or a pre-agreement with the base station; or determining one or more target receiving beams with the best signal receiving quality from receiving beams which receive the N downlink pilot signals, according to a measurement result of the N downlink pilot signals, and one-time feeding back information on the target receiving beams to the base station, in a case that the same precoding manner is used for the N downlink pilot signals, if one-time feeding back is determined to be required according to the notification of the base station or a pre-agreement with the base station; or determining one or more target receiving beams with the best signal receiving quality from receiving beams which receive the N downlink pilot signals, according to a measurement result of the N downlink pilot signals, determining target transmitting beams corresponding to the target receiving beams, and one-time feeding back information on the target transmitting beams or information on the downlink pilot signals received by the target receiving beams to the base station, in a case that different precoding manners are used for the N downlink pilot signals.

4. The method according to claim 1, wherein in a case that the transmission manner of the N downlink pilot signals is semi-persistent transmission and the feedback manner is one-time feeding back of the feedback information on the N downlink pilot signals, the method further comprises:

receiving a second indication message from the base station, wherein the second indication message is to indicate to stop transmitting the feedback information on the pilot signals; and stopping transmitting the feedback information on the pilot signals to the base station according to the second indication message.

5. A signal processing method, which is applied to a base station, the method comprising:

transmitting a third indication message to a terminal device, wherein the third indication message is to trigger the terminal device to transmit uplink pilot signals;

receiving M uplink pilot signals transmitted by the terminal device according to an acquired precoding manner of the uplink pilot signals, and measuring the M uplink pilot signals respectively, where M is an integer greater than or equal to 2, and the transmission manner of the M uplink pilot signals is semi-persistent transmission or aperiodic transmission;

acquiring a precoding manner of the M uplink pilot signals; and determining a feedback manner of the feedback information on the M uplink pilot signals and performing feedback, according to the precoding manner of the uplink pilot signals, wherein the feedback manner comprises not feeding back or one-time feeding back of the feedback information on the M uplink pilot signals, wherein the precoding manner of the uplink pilot signals comprises: using the same precoding manner for the M uplink pilot signals and using different precoding manners for the M uplink pilot signals.

6. The method according to claim 5, wherein a manner of notifying the precoding manner of the uplink pilot signals comprises:

including the precoding manner of the uplink pilot signals in the third indication message, and notifying the precoding manner of the uplink pilot signals by the third indication message; or configuring the precoding manner of the uplink pilot signals to the terminal device by using a high-layer signaling; or transmitting the precoding manner of the uplink pilot signals to the terminal device; or transmitting a notification signaling to the terminal device, wherein the notification signaling comprises the precoding manner of the uplink pilot signals; or pre-agreeing the precoding manner of the uplink pilot signals with the terminal device.

7. The method according to claim 5, wherein the precoding manner of the uplink pilot signals comprises: using the same precoding manner for the M uplink pilot signals and using different precoding manners for the M uplink pilot signals;

the determining the feedback manner of the feedback information on the M uplink pilot signals and performing feedback according to the precoding manner of the uplink pilot signals comprises:

determining that the feedback manner of the feedback information on the M uplink pilot signals is not feeding back, in a case that the same precoding manner is used for the M uplink pilot signals; or determining one or more target uplink pilot signals with the best signal quality according to a measurement result of the M uplink pilot signals, and one-time feeding back information on the target uplink pilot signals to the terminal device, in a case that different precoding manners are used for the M uplink pilot signals.

8. The method according to claim 5, wherein in a case that the transmission manner of the M downlink pilot signals is semi-persistent transmission, the method further comprises:

transmitting a fourth indication message to the terminal device, wherein the fourth indication message is to indicate the terminal device to stop transmitting the uplink pilot signals.

9. The method according to claim 5, further comprising:

transmitting a fifth indication message to the terminal device, wherein the fifth indication message is to notify the terminal device whether a transmitting beam needs to be changed when the uplink pilot signals are subsequently transmitted.

10. A signal processing method, which is applied to a terminal device, the method comprising:

receiving a third indication message from a base station, wherein the third indication message is to trigger transmission of uplink pilot signals;

acquiring a precoding manner of the uplink pilot signals; and transmitting M uplink pilot signals according to the precoding manner of the uplink pilot signals and the third indication message, where M is an integer greater than or equal to 2, and the transmission manner of the M uplink pilot signals is semi-persistent transmission or aperiodic transmission, so that the base station, according to the acquired precoding manner of the uplink pilot signals, determines a feedback manner of the feedback information on the M uplink pilot signals and performs feedback, and wherein the feedback manner comprises not feeding back or one-time feeding back of the feedback information on the M uplink pilot signals, wherein the precoding manner of the uplink pilot signals comprises: using the same precoding manner for the M uplink pilot signals and using different precoding manners for the M uplink pilot signals.

11. The method according to claim 10, wherein the acquiring the precoding manner of the uplink pilot signals comprises:
including the precoding manner of the uplink pilot signals in the third indication message, and acquiring the precoding manner of the uplink pilot signals according to the third indication message; or
acquiring the precoding manner of the uplink pilot signals according to a high-layer signaling; or
acquiring the precoding manner of the uplink pilot signals according to a pre-agreement with the base station; or
receiving the precoding manner of the uplink pilot signals transmitted by the base station; or
receiving a notification signaling transmitted by the base station, and acquiring the precoding manner of the uplink pilot signals according to the notification signaling, wherein the precoding manner of the uplink pilot signals is included in the notification signaling.

12. The method according to claim 10, wherein in a case that the transmission manner of the M uplink pilot signals is semi-persistent transmission, the method further comprises:
receiving a fourth indication message transmitted by the base station, wherein the fourth indication message is to indicate the terminal device to stop transmitting the uplink pilot signals; and
stopping transmitting the uplink pilot signals to the base station according to the fourth indication message.

13. The method according to claim 10, further comprising:
receiving a fifth indication message transmitted by the base station, wherein the fifth indication message is to notify whether a transmitting beam needs to be changed when the uplink pilot signals are subsequently transmitted.

14. The method according to claim 10, wherein in a case that the base station determines that the feedback manner of the feedback information on the M uplink pilot signals is one-time feeding back of the feedback information on the M uplink pilot signals, the method further comprises:
receiving the feedback information on the M uplink pilot signals transmitted by the base station; and
determining an uplink transmission beam according to the feedback information on the M uplink pilot signals.

15. A terminal side device, comprising a processor, a storage, and a computer program which is stored in the storage and is capable of running on the processor, wherein when the computer program is executed by the processor, steps of the signal processing method according to claim 6 are implemented.

16. A network side device, comprising a processor, a storage, and a computer program which is stored in the storage and is capable of running on the processor, wherein when the computer program is executed by the processor, steps of the signal processing method according to claim 5 are implemented.

17. A terminal side device, comprising a processor, a storage, and a computer program which is stored in the storage and is capable of running on the processor, wherein when the computer program is executed by the processor, steps of the signal processing method according to claim 10 are implemented.

18. The method according to claim 5, wherein the base station transmits a first indication message to the terminal device, and a manner of notifying the precoding manner of the downlink pilot signals comprises:
including the precoding manner of the downlink pilot signals in the first indication message, and notifying the precoding manner of the downlink pilot signals by the first indication message; or
configuring the precoding manner of the downlink pilot signals to the terminal device by using a high-layer signaling; or
transmitting the precoding manner of the downlink pilot signals to the terminal device; or
transmitting a notification signaling to the terminal device, wherein the notification signaling comprises the precoding manner of the downlink pilot signals; or
pre-agreeing the precoding manner of the downlink pilot signals with the terminal device.

19. The network side device according to claim 16, wherein the network side device transmits a first indication message to the terminal device, and a manner of notifying the precoding manner of the downlink pilot signals comprises:
including the precoding manner of the downlink pilot signals in the first indication message, and notifying the precoding manner of the downlink pilot signals by the first indication message; or
configuring the precoding manner of the downlink pilot signals to the terminal device by using a high-layer signaling; or
transmitting the precoding manner of the downlink pilot signals to the terminal device; or
transmitting a notification signaling to the terminal device, wherein the notification signaling comprises the precoding manner of the downlink pilot signals; or
pre-agreeing the precoding manner of the downlink pilot signals with the terminal device.

* * * * *